United States Patent [19]
Lewis

[11] Patent Number: 5,574,777
[45] Date of Patent: Nov. 12, 1996

[54] CALLER ID AND CALL WAITING FOR MULTIPLE CPES ON A SINGLE TELEPHONE LINE

[75] Inventor: Harry W. Lewis, Morgan Hill, Calif.

[73] Assignee: CIDCO Incorporated, Morgan Hill, Calif.

[21] Appl. No.: 486,461

[22] Filed: Jun. 7, 1995

Related U.S. Application Data

[62] Division of Ser. No. 388,108, Feb. 13, 1995.

[51] Int. Cl.$^6$ .......................... H03M 15/00; H03M 15/06; H03M 11/00; H03M 3/00

[52] U.S. Cl. ........................ 379/142; 379/106; 379/107; 379/127; 379/194; 379/195; 379/245; 379/246; 379/247

[58] Field of Search ...................................... 379/124, 142, 379/106, 107, 194, 195, 245, 246, 247

[56] References Cited

U.S. PATENT DOCUMENTS

| | | | |
|---|---|---|---|
| 4,582,956 | 4/1986 | Doughty | 179/2 A |
| 4,703,499 | 10/1987 | Fossas et al. | 379/194 |
| 5,093,856 | 3/1992 | Atkinson et al. | 379/95 |
| 5,206,900 | 4/1993 | Callele | 379/142 |
| 5,228,080 | 7/1993 | Nutter et al. | 379/373 |
| 5,263,084 | 11/1993 | Chaput et al. | 379/215 |
| 5,327,493 | 7/1994 | Richmond et al. | 379/372 |
| 5,353,342 | 10/1994 | Pietrowicz | 379/142 |
| 5,381,462 | 1/1995 | Larson | 379/107 |
| 5,388,150 | 2/1995 | Schneyer et al. | 379/67 |
| 5,394,461 | 2/1995 | Garland | 379/106 |
| 5,452,289 | 9/1995 | Sharma et al. | 370/32.1 |

FOREIGN PATENT DOCUMENTS

| | | |
|---|---|---|
| 2258119 | 1/1993 | United Kingdom. |
| WO93/11643 | 6/1993 | WIPO. |

OTHER PUBLICATIONS

The Analog Display Service Interface, pp. 70–75; IEEE Magazine, Apr. 1993.
Bellcore Special Report, "A Method and Apparatus for Detecting a Dual Tone Signal in the Presence of Speech" SR–TSV–002578 Issue 1 (1993).
Bellcore Special Report, "Customer Premises Equipment Compatibility Considerations for the Voiceband Data Transmission Interface" SR–TSV–002467 Issue 1 (1992).

*Primary Examiner*—Wellington Chin
*Assistant Examiner*—Vijay Shankar
*Attorney, Agent, or Firm*—Skjerven, Morrill, MacPherson, Franklin & Friel; Alan H. MacPherson; E. Eric Hoffman

[57] ABSTRACT

In accordance with the present invention, provided is a system allowing a plurality of conforming customer premise equipment ("CCPEs") on a single telephone line to display a third party's caller information while users are communicating with a second party. One CCPE of the plurality of CCPEs is a primary CCPE, whereas the remaining CCPE(s) are secondary CCPE(s). While the users are communicating with the second party using any one or more of the CCPEs, each CCPE detects whether a CPE alerting signal ("CAS") tone has been transmitted by the central office, thereby detecting when the third party is calling. Each CCPE responds by disconnecting the CCPE's telephone from the telephone line. After all of the CCPEs are on-hook, the primary CCPE then goes off-hook and transmits a CAS acknowledgement ("CAS ACK") signal to the central office. All of the CCPEs then wait for the central office to transmit the CID information in response to the CAS ACK signal.

6 Claims, 19 Drawing Sheets

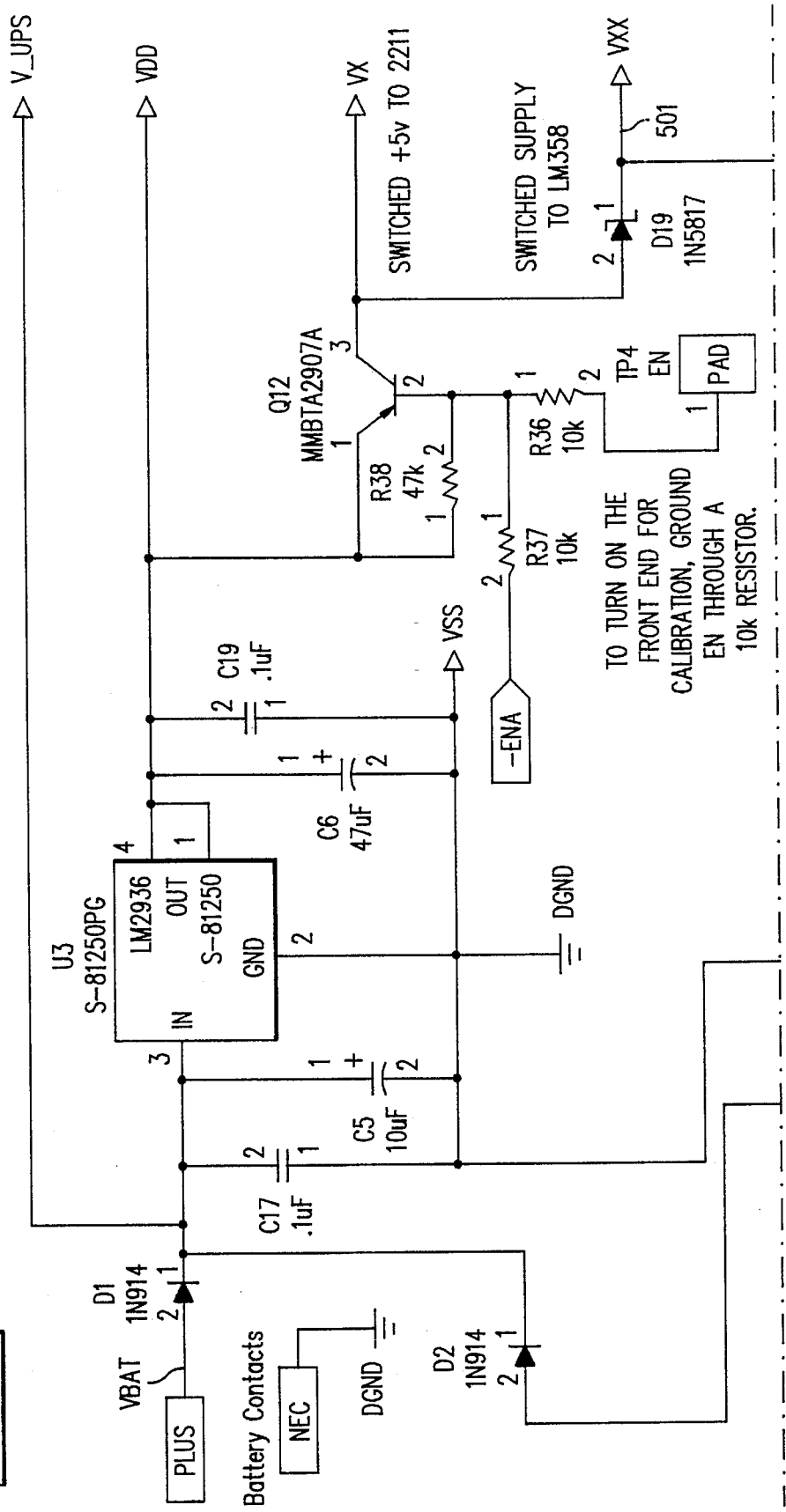
FIG. 5A
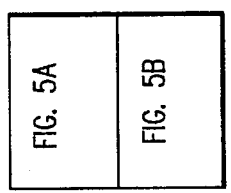
KEY TO FIG. 5
| FIG. 5A |
| FIG. 5B |

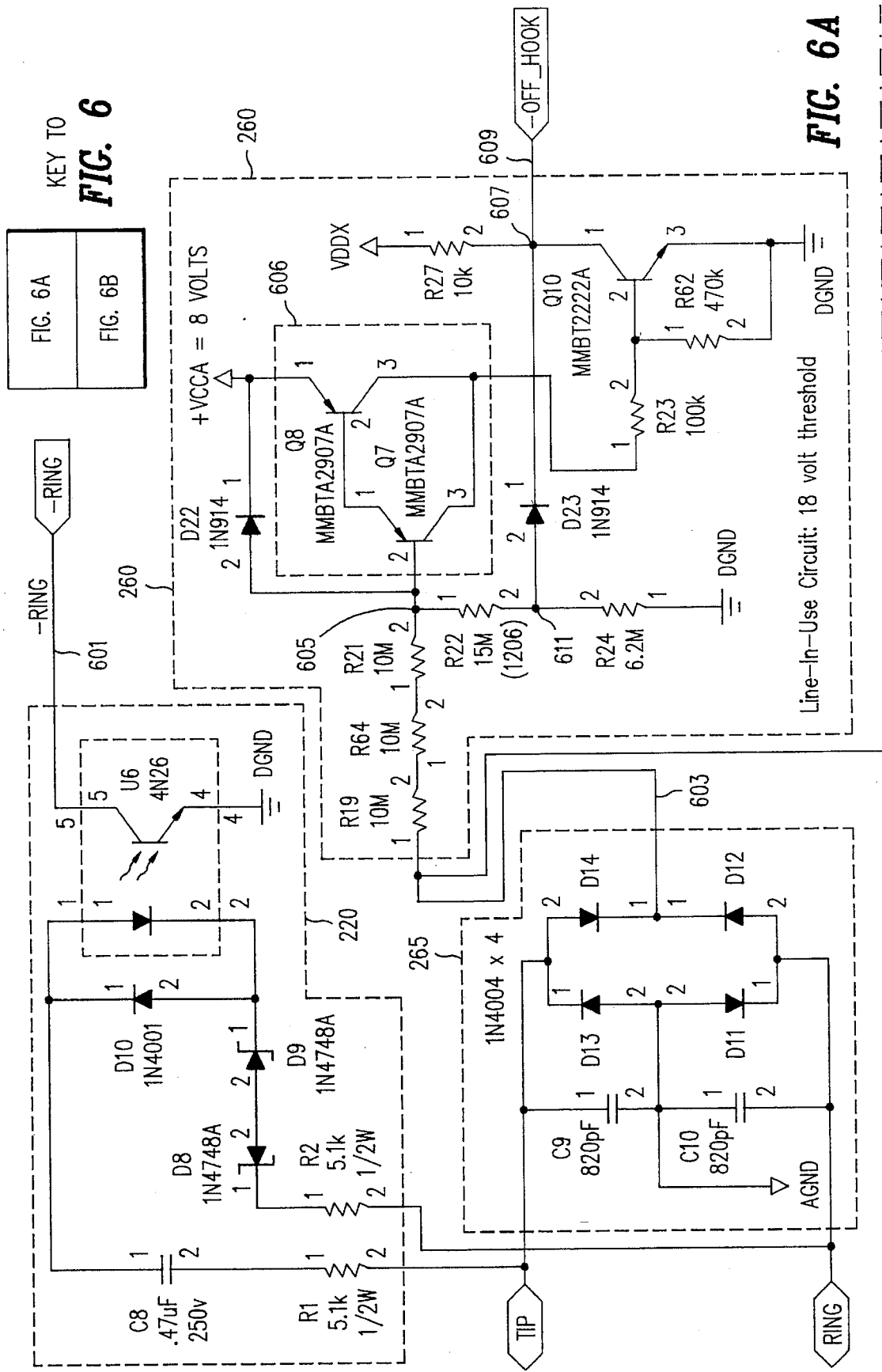

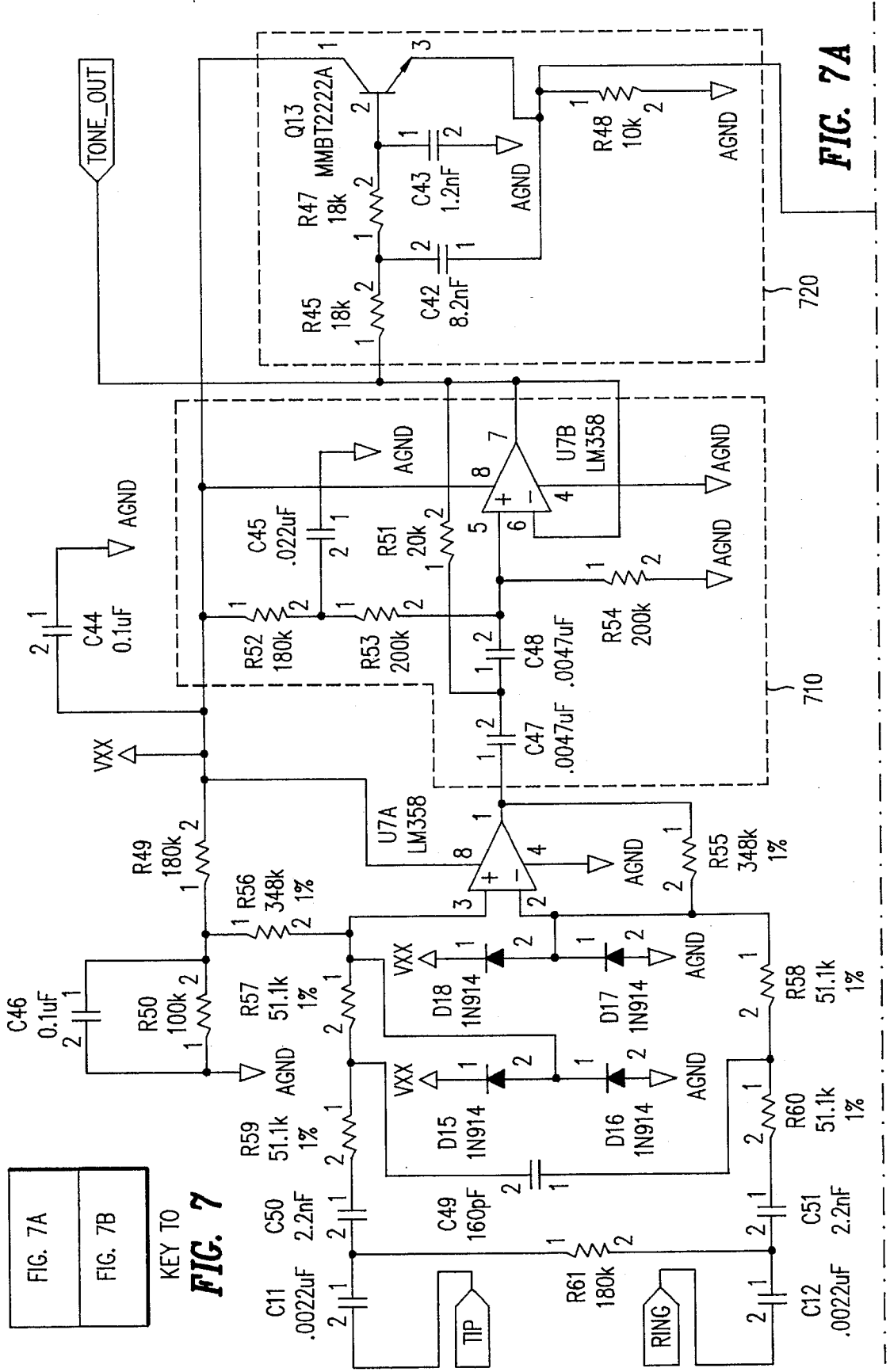

Above symbol represents 1/2 of microcontroller IC,
Remainder of IC is shown on the next sheet.
Pin #'s on microcontroller IC are actually the IC chip's pad numbers.

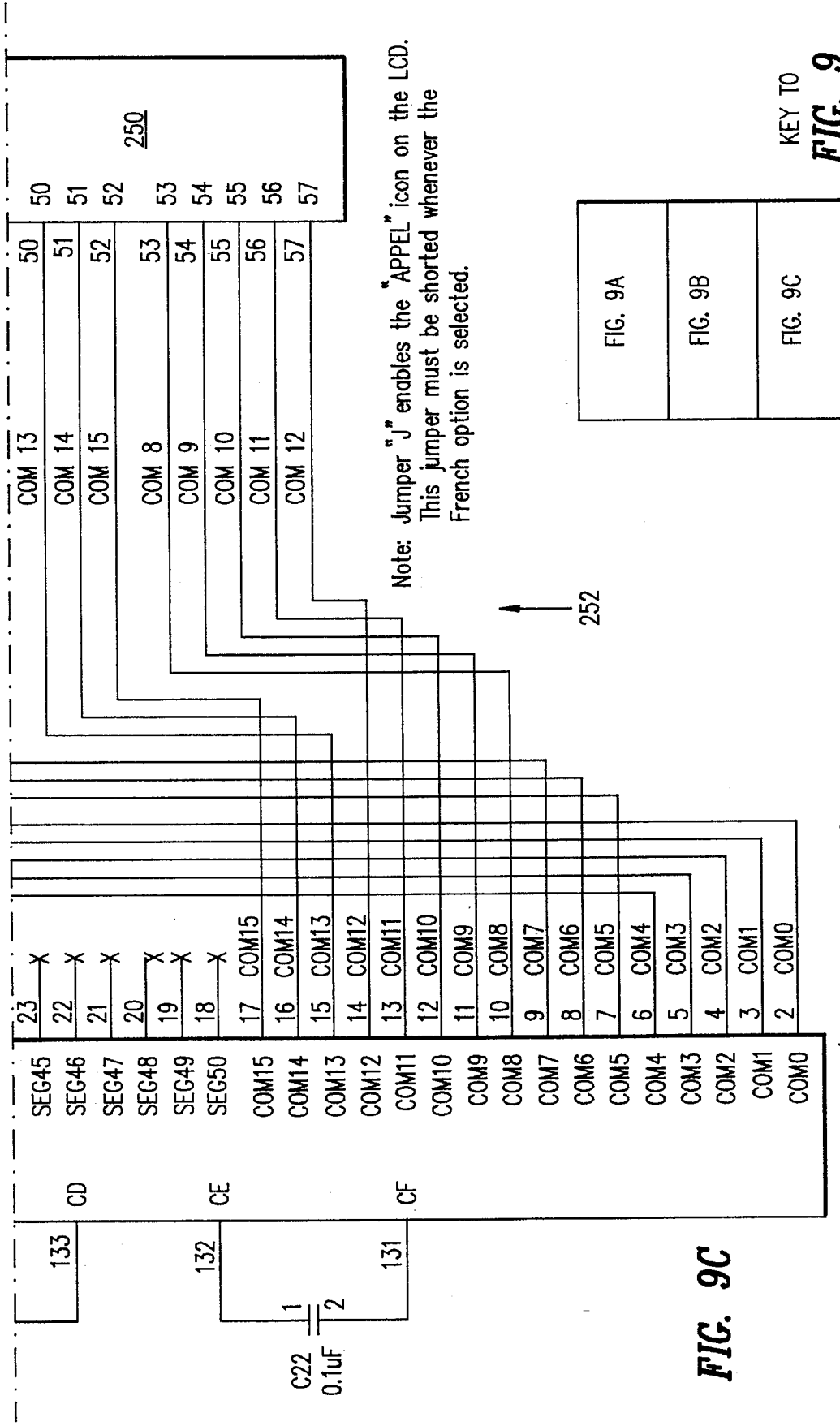

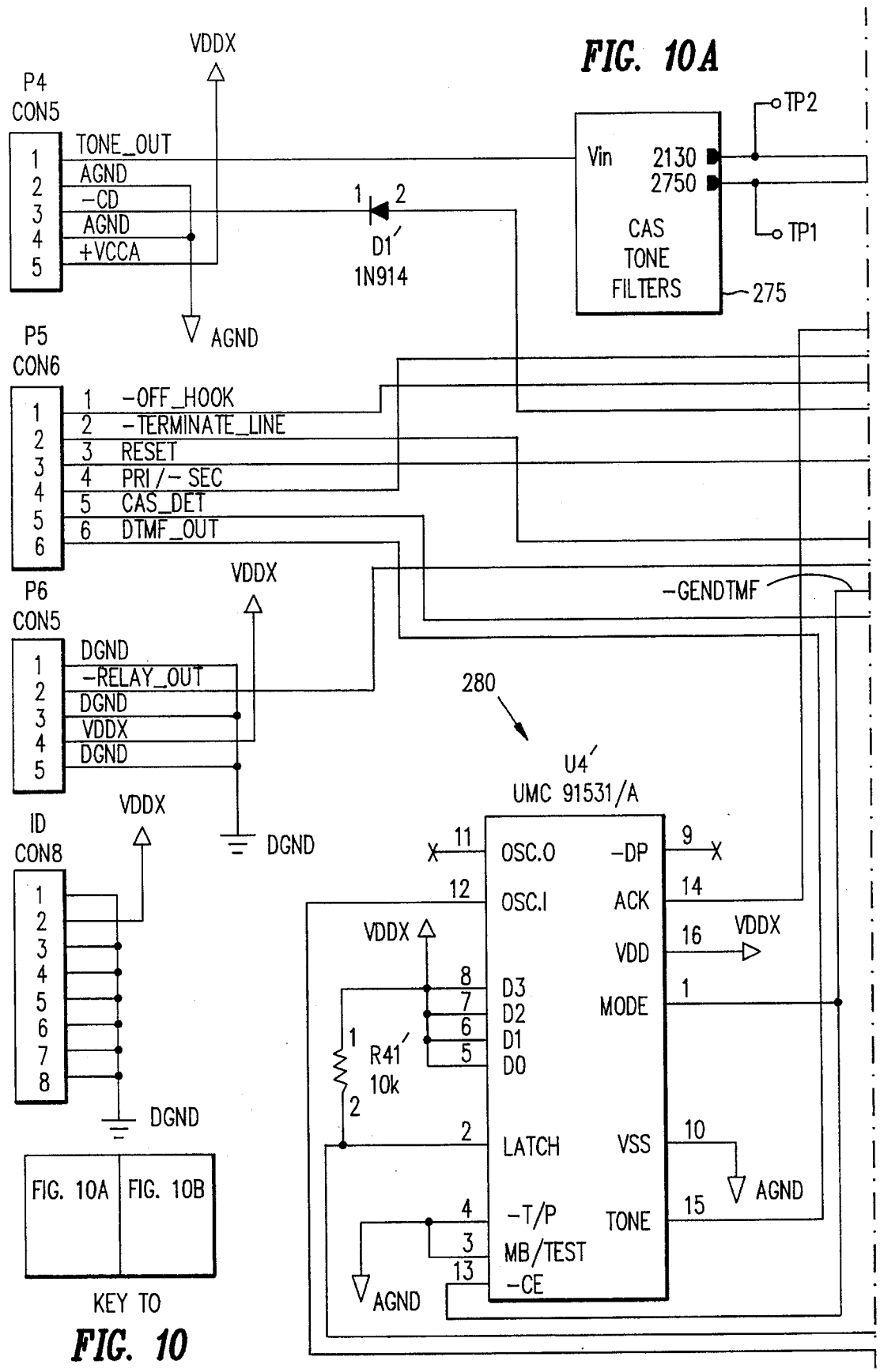

CALLER ID AND CALL WAITING FOR MULTIPLE CPES ON A SINGLE TELEPHONE LINE

This application is a division of Ser. No. 388,108 filed Feb. 13, 1995.

FIELD OF THE INVENTION

This invention is related to telephone subscriber systems and more particularly to systems having caller identification and call waiting for multiple CPEs on a single telephone line.

BACKGROUND INFORMATION

The call waiting ("CW") feature available on many telephone operating systems allows the telephone operating system to notify a user currently communicating with a second party over a telephone line that a third party is attempting to call the subscriber. Typically, the system notifies the user of the third party's call by using a special CW tone. The subscriber has the option to put the second party on hold to receive the third party's call or ignore the CW tone.

The caller identification ("CID") feature available on some telephone operating systems allows the telephone operating system to transmit a caller's telephone number as a digitally coded signal to the user's telephone or telephone with adjunct (hereinafter referred to as a "CPE" for customer premises equipment). The user's CPE has circuitry to receive and decode the digital signal and display the caller's telephone number. This allows the user to answer or ignore the call based on the caller's telephone number.

Some CPEs allow for using the CID and CW features together in a CIDCW system, whereby the user's telephone set displays the third party's caller information (e.g. telephone number, caller's name, or both) while the user is communicating with the second party. These conventional systems generally detect whether an extension CPE is off-hook (which typically means that a user is using this extension CPE) and terminate the CID feature upon such detection. These CIDCW systems do not allow for simultaneously using multiple conventional CIDCW CPEs on the same telephone line for at least the following reasons: the circuitry of the conventional CIDCW CPEs tests for other CPEs being off-hook and shuts off the CIDCW capability in such cases; the user(s) would hear the CID information being transmitted from the central office (the CID information signal is typically irritating for the user(s) to hear); any voice signals from the user(s) would interfere with the handshaking signals used in transmitting the CID information; and the conventional CIDCW CPEs would cause contention problems when each CIDCW CPE attempts to transmit an acknowledgement signal in response to a signal from the operating system indicating a third party is trying to call.

SUMMARY

In accordance with the present invention, provided is a system allowing a plurality of CPEs on a single telephone line to display a third party's caller information while users are communicating with a second party. The CPEs in accordance with the present invention are hereinafter referred to as CCPEs for conforming CPEs.

According to one embodiment of the present invention, one CCPE of the plurality of CCPEs is a primary CCPE, whereas the remaining CCPE(s) are secondary CCPE(s). While the users are communicating with the second party using any one or more of the CCPEs, each CCPE detects whether a CPE alerting signal ("CAS") tone has been transmitted by the central office, thereby detecting when the third party is calling. Each CCPE responds by disconnecting the CCPE's telephone from the telephone line.

After all of the CCPEs are on-hook, the primary CCPE then goes off-hook and transmits a CAS acknowledgement ("CAS ACK") signal to the central office. All of the CCPEs then wait for the central office to transmit the CID information in response to the CAS ACK signal.

After the CID information is received by the CCPEs, the CCPEs then reconnect the telephone line to the house telephone of the CCPE and then the primary CCPE goes on-hook. As a result, contention during the CAS ACK signal transmission is avoided and each CCPE of the plurality of CCPEs coupled to the single telephone line displays the caller information, even if the users are communicating with the second party on secondary CCPEs.

Another embodiment allows for using conventional CPEs without CIDCW circuitry according to the present invention (hereinafter referred to as "NCPEs" for non-conforming CPEs) on the phone line along with CCPEs according to the present invention. Each CCPE detects whether a CAS tone has been sent by the central office. Upon detection of a CAS tone, each CCPE disconnects the CCPE's telephone from the telephone line and goes on-hook. Each CCPE then detects if any NCPE is off-hook.

When no off-hook NCPE is detected, the primary CCPE goes off-hook and transmits the CAS ACK signal to the central office and waits for central office to respond with the CID information. The secondary CCPEs remain on-hook and wait for the caller information. The central office responds to the CAS ACK signal by transmitting the CID information, which the CCPEs then display. Each CCPE then reconnects the CCPE's telephone to the telephone line. Thus, each CCPE of the plurality of CCPEs coupled to the single telephone line displays the CID information, even if the users are communicating with the second party on secondary CCPEs.

On the other hand, when an off-hook NCPE is detected, the primary CCPE does not go off-hook to transmit the CAS ACK signal and each CCPE reconnects the CCPE's house telephone to the telephone line and return to monitoring for a CAS tone. As a result, the central office does not transmit caller information for display.

DETAILED DESCRIPTION

Figure 1:
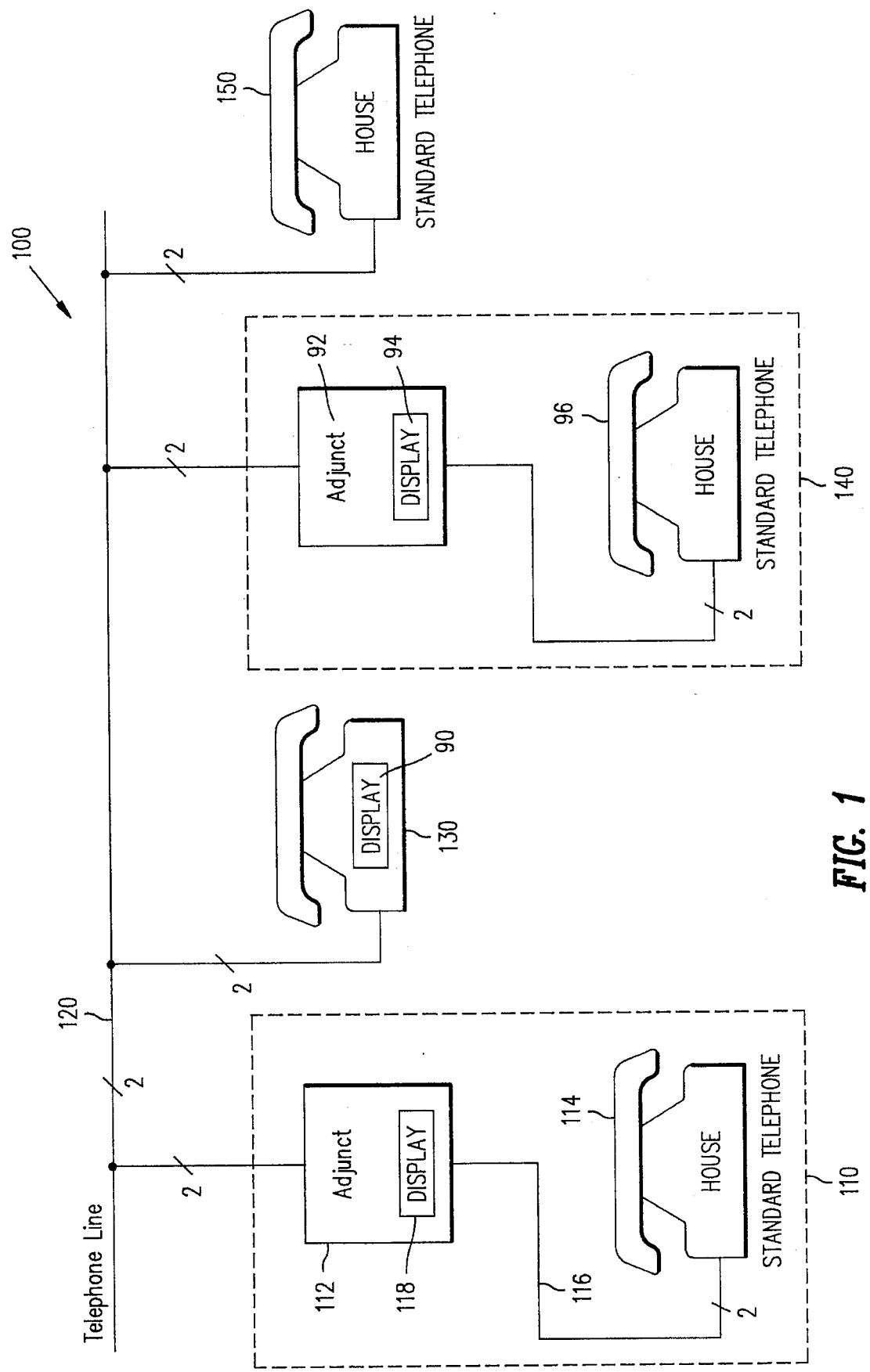
FIG. 1 shows a block diagram of a CIDCW system having a plurality of CPEs according to one embodiment of the present invention.

FIG. 1 shows a block diagram of a CIDCW system 100 allowing multiple CPEs on a single telephone line to display a third party's caller information while a user is communicating with a second party. A CCPE 110 is coupled to telephone line 120. Telephone line 120 is the standard two wire telephone line, which includes the ring and tip lines. CCPE 110 comprises a conforming adjunct 112 and standard (or house) telephone 114, coupled together via line 116. As described below in conjunction with FIG. 2, adjunct 112 contains circuitry allowing a user to display a third party's caller information on display 118, including the case where the user is currently communicating with a second party over phone line 120 (i.e., the CIDCW feature).

A CCPE 130, comprising a telephone with conforming circuitry, and a display 90 is also coupled to telephone line 120. CCPE 130 can utilize some circuitry already present in a standard telephone to help implement the conforming CIDCW functionality. A CCPE 140, also comprising an adjunct 92 which includes a display 94 and standard telephone 96, is coupled to telephone line 120. A NCPE 150, comprising a standard telephone, is connected directly to telephone line 120. Although FIG. 1 shows a system having two adjunct CCPEs, one telephone CCPE, and one NCPE, other embodiments have different combinations of adjunct CCPEs, telephone CCPEs, computer CCPEs and NCPEs. CCPEs can have other embodiments, such as computers with modems, facsimile machines, or other equipment for transmitting and/or receiving information over telephone lines.

Figure 2A:
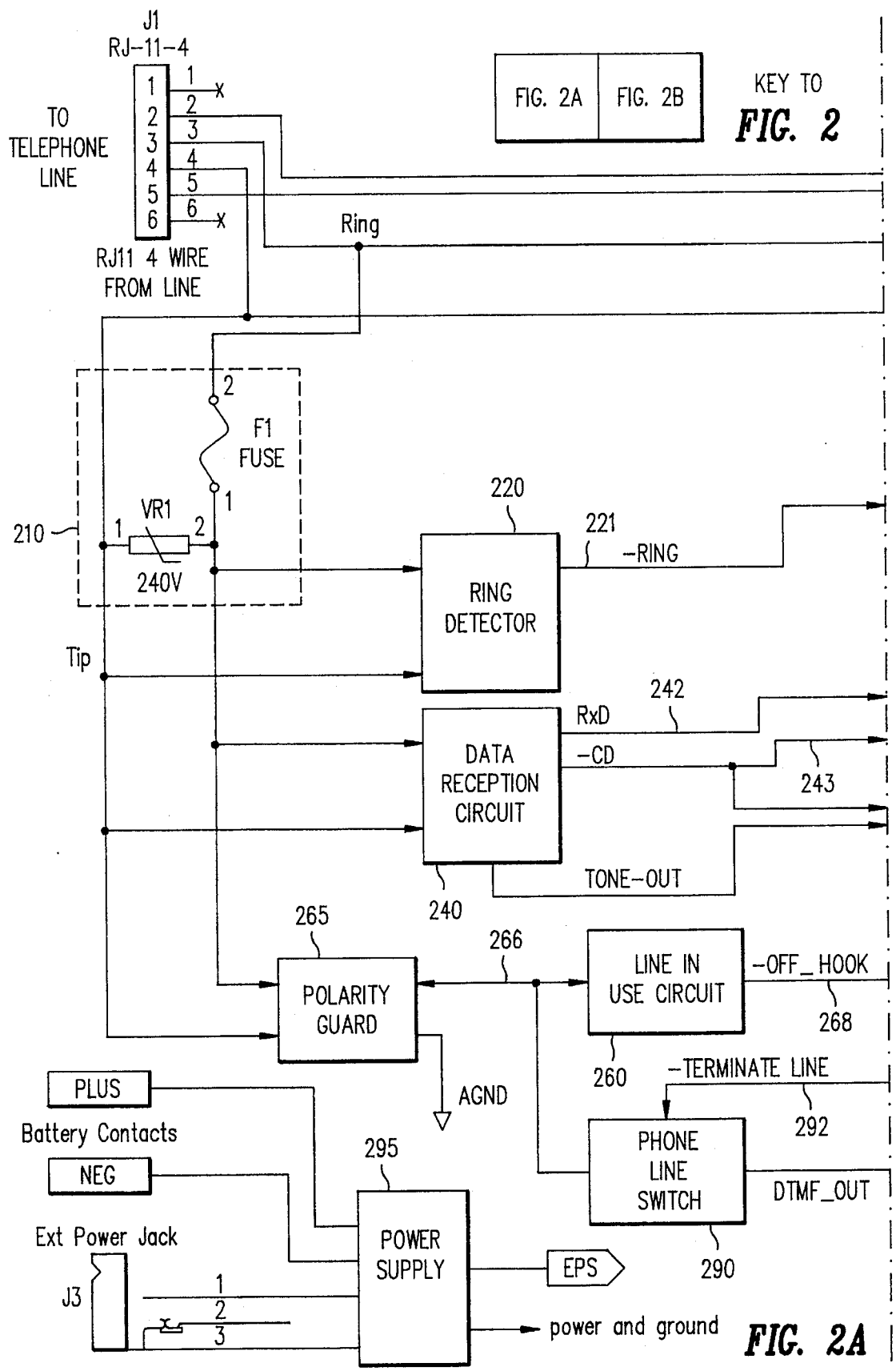
FIG. 2 shows a block diagram of one embodiment of an adjunct depicted in FIG. 1.
Figure 2B:
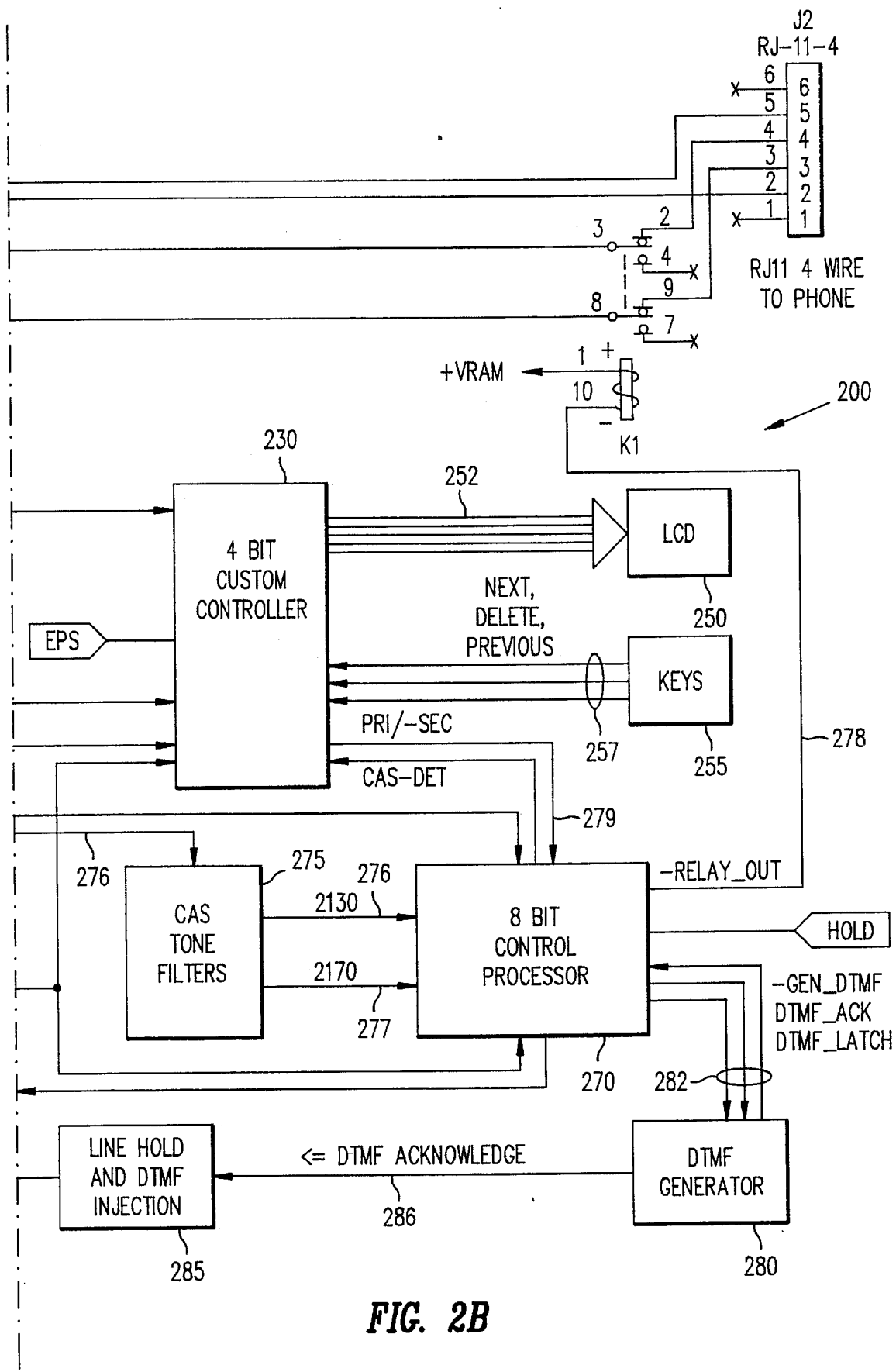

FIG. 2 shows a block diagram of one embodiment of adjunct 112 for coupling a standard telephone to telephone line 120. Adjunct 112 is coupled to the telephone line 120 via connector J1 and to the standard telephone (not shown) via connector J2. Connectors J1 and J2 can be a standard telephone connector such as a RJ-11-4 type connector. Pins 3 and 4 of connector J1 are coupled to the ring and tip lines of the telephone line 120 to receive the ring and tip signals from the central office. Pins 1 and 5 of connector J1 are unused in this embodiment, but can be used for coupling to a second telephone line. A line protection circuit 210, comprising varistor VR1 and fuse F1 to protect against overvoltage and overcurrent conditions on the ring and tip lines.

A ring detector 220 monitors the ring and tip lines and outputs a -RING signal on line 221 when a ring signal is detected on telephone line 120. Ring detector 220 is described in further detail in conjunction with FIG. 6.

A custom controller 230 is coupled to line 221 and, thus, receives the -RING signal when ring detector 220 detects a call. Custom controller 230, in response to the -RING signal, sets up to receive the CID information for an on-hook incoming call.

In addition, custom controller 230 generates a PRI/-SEC signal, which configures adjunct 112 as either a primary or secondary. In this embodiment, the PRI/-SEC signal output is programmed by jumper connections on custom controller 230. Other embodiments can have the PRI/-SEC signal programmed by other means, such as being hardwired to a voltage source to configure adjunct 112 as a primary, or to a source of ground potential to configure adjunct 112 as a secondary, or a register, flip flop, or memory, which can be loaded at start up or by a control code input by the user.

A data reception circuit 240 is also coupled to the ring and tip lines. Data reception circuit 240 receives the caller information as a coded digital signal from the central office. In this embodiment, the central office sends the caller information in a frequency shift keying ("FSK") format. Data reception circuit 240 decodes the FSK signal and outputs the caller information in digital logic voltage levels on output lead 242 via a signal RxD.

Data reception circuit 240 also outputs a -CD signal on output lead 243, which indicates that data reception circuit 240 is detecting the carrier signal for the FSK signal transmitted by the central office. Custom controller 230, coupled to lead 242, receives the CID information. In response to the CID information, custom controller 230, coupled to a LCD 250 via lines 252, transmits driver signals to LCD 250. The driver signals cause LCD 250 to display the caller information.

A key circuit 255 is coupled to custom controller 230 via lines 257. Key circuit 255 generates NEXT, DELETE and PREVIOUS signals for controlling the display of stored caller information and for selecting operation modes. Key circuit 255 is described further in conjunction with FIG. 8.

A line-in-use circuit ("LIU") 260 is coupled to the tip and ring lines through a polarity guard 265 via line 266. Polarity guard 265 protects against a miswiring of the tip and ring lines into telephone line 120 and provides the telephone line voltage to line 266.

LIU 260 detects whether a CPE is in use (i.e., off-hook) by monitoring the telephone line voltage as described further below in conjunction with FIG. 5. LIU 260 outputs on a line 268 a -OFF_HOOK signal, which is at a logic 0 level when LIU 260 detects that a telephone is off-hook. The -OFF_HOOK signal is received by custom controller 230 and a control processor 270. As a result, custom controller 230 and control processor 270 know whenever any CPE is off-hook.

Data reception circuit 240 also provides a TONE_OUT signal to CAS to filter circuit 275 via line 276. Data reception circuit 240 and CAS tone filter circuit 275 operate to detect when the central office transmits a CAS tone indicating a calling third party's CID information is available while the user is communicating to a second party over the telephone line 120. In this embodiment, the CAS tone is a dual tone of 2130 Hz and 2750 Hz and, accordingly, CAS tone filter circuit 275 outputs a 2130 signal (i.e., a 2130 Hz square wave signal) and a 2750 signal (i.e., a 2750 Hz square wave signal), respectively indicating the detection of a 2130 Hz signal and a 2750 Hz signal on telephone line 120.

Control processor 270 is coupled to CAS tone filter circuit 275 via lines 276 and 277 and to a DTMF generator 280 via lines 282. Control processor 270 receives the 2130 and 2750 signal form CAS tone filter circuit 275 over lines 276 and 277.

Further, control processor 270 is coupled to the control lead of a relay K1 via line 278. Control processor 270 controls the operation of relay K1 to connect or disconnect the ring and tip lines from connector J2 (i.e., disconnects the house telephone).

Control processor 270 also receives the PRI/-SEC signal from custom controller 230 via line 279. Custom controller 230 causes the PRI/-SEC signal to be a logic 1 when adjunct 112 is configured as a primary and a logic 0 when adjunct 112 is configured as a secondary. When the 2130 and 2750 signals indicate the presence of the CAS tone, control processor 270 qualifies the CAS tone signals and then asserts a CAS_DET signal transmitted to custom controller 230. The assertion of the CAS_DET signal alerts custom controller 230 that a third party is trying to call while telephone line 120 is already in use. In addition, if adjunct 112 is a primary (i.e., the PRI/-SEC signal is a logic 1), control processor 270 asserts a -GEN_DTMF signal transmitted to DTMF generator 280. After a handshaking procedure using the -GEN_DTMF, DTMF_ACK and DTMF_LATCH signals, DTMF generator 280 transmits a CAS ACK signal to a line hold and DTMF injection ("line hold") circuit 285 via line 286. The handshaking signals are described below in conjunction with FIG. 10.

Line hold circuit 285 and a phone line switch 290 operate to place adjunct 112 in the off-hook condition. Phone line switch 290 is coupled to control processor 270 via a line 292. Control processor 270 can cause adjunct 112 to be in an off-hook condition by sending a -TERMINATE_LINE signal to phone line switch 290 via line 292. As described below in conjunction with FIG. 6, upon assertion of the -TERMINATE_LINE signal, phone line switch 290 and line hold circuit 285 operate to couple an impedance equivalent to the impedance of a standard telephone to the telephone line. Further, line hold circuit 285 also transmits a version of the DTMF ACK signal generated by DTMF generator 280 to telephone line 120.

A power supply 295 directly or indirectly supplies the power and ground potentials to the circuitry of adjunct 112. Power supply 295 includes a battery for back up purposes and can power adjunct 112 to receive on-hook calls. Power supply 295 can be coupled via connector J3 to an AC adapter for converting AC power to a DC voltage to be regulated by power supply 295.

Power supply 295 transmits an EPS (for external power source) signal to custom controller 230. Power supply 295 asserts the EPS signal when the output voltage supplied by power supply 295 is above a threshold voltage. If the external power is inadequate, custom controller 230 turns off the adjunct's CIDCW capability. However, adjunct 112 can still operate as a CID adjunct.

Although FIG. 2 shows a block diagram of an adjunct, FIG. 2 also applies to a block diagram of the pertinent part of a telephone CCPE.

Figure 3A:
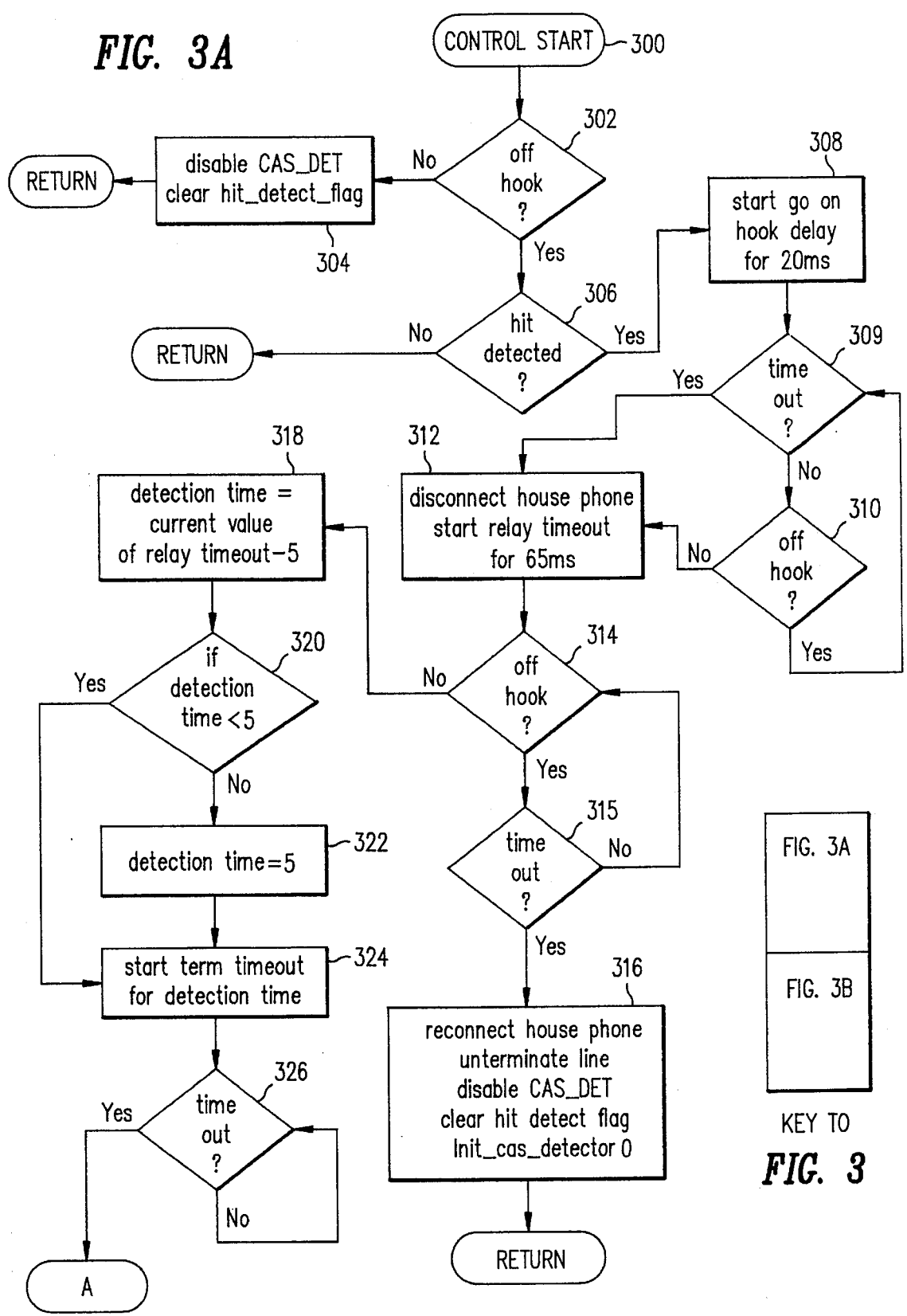
FIG. 3, which is comprised of FIGS. 3a and 3b, shows a flow diagram illustrating the operation of the CIDCW system depicted in the embodiment of FIG. 1.
Figure 3B:
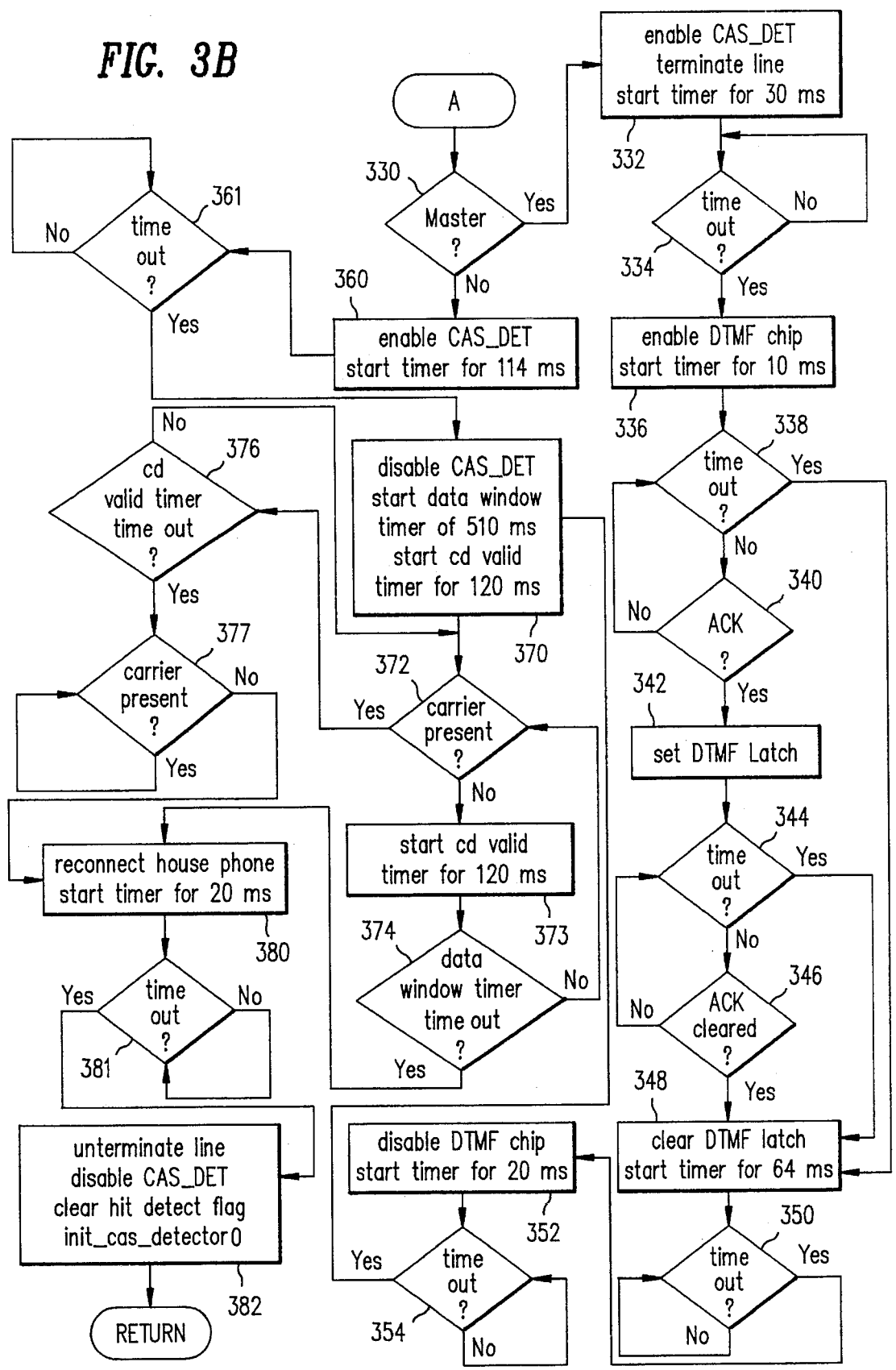

FIG. 3 shows a flow diagram illustrating the operation of adjunct 112. Source code executed by control processor 270 to implement the flow diagram of FIG. 3 is contained within the APPENDIX 1 "scwid_control", which is a part of this application and incorporated herein by reference in its entirety.

A step 300 is the starting point for operation of adjunct 112. In a next step 302, the -OFF_HOOK signal from LIU 260 is checked to determine if LIU 260 detected an off-hook condition. If LIU 260 did not detect an off-hook condition, then control processor 270 deasserts the CAS_DET signal in a step 304 and the process returns to step 300.

However, if LIU 260 did detect an off-hook condition, then in a step 306 the CAS_DET signal is checked to determine if the central office sent a CAS tone. If CAS tone is not detected, then the process returns to step 300. On the other hand, if a CAS tone is detected, a 20 ms delay timeout is started in a step 308 to allow for different CAS tone detection times for the CCPEs on telephone line 120. In a next step 309, the 20 ms timeout is tested to see if it is expired. If the time-out is not complete, the -OFF_HOOK signal is checked in a step 310 to see if a telephone is still off-hook. If the off-hook condition still exists, then the process returns to step 309. However, if there is no longer an off-hook condition, or when the 20 ms timeout is expired, the process moves to a next step 312.

In step 312, a 65 ms relay timeout is started, and the control processor 270 asserts the -RELAY_OUT signal to control relay K1 to disconnect the ring and tip lines from the house phone 114 coupled to adjunct 112. Thus, the house phone can no longer couple a termination to telephone line 120 to cause an off-hook condition. Control processor also deasserts the -TERMINATE_LINE signal to cause phone line switch 290 to not couple telephone line 120 to an internal return (DGND) of line hold circuit 285. As a result, adjunct 112 also does not cause an off-hook condition. Thus, the CCPE of which adjunct 112 is a part of is on-hook. Further, all other CCPEs (if any) coupled to telephone line 120 should also enter the on-hook condition in a similar manner and within the 65 ms relay timeout. Accordingly, only NCPEs (if any) currently in use would remain in the off-hook condition.

The 20 ms timeout procedure (steps 308–310) synchronizes the time when all of the CCPEs go on-hook. As a result, this procedure minimizes the time that telephone line 120 is in the on-hook condition, thereby greatly reducing the risk that the connection to the central office will be broken or that interference will be caused to the DTMF acknowledgement circuitry in the central office.

In a next step 314, the -OFF_HOOK signal is again checked to determine if a telephone is in the off-hook condition. If an off-hook condition is detected, then the 65 ms timeout is checked to see if it expired in a step 315. If the 65 ms timeout is not expired, then the process returns to step 314. If the 65 ms timeout has expired, then control processor 270 deasserts the CAS_DET signal and controls relay K1 to reconnect the house telephone. The process then returns to step 300. on the NCPE telephone(s) from being forced to hear the FSK signal transmitted by the central office.

However, if in step 314 no off-hook condition is detected, a detection timer is loaded with a time 5 ms less than the current value of the 65 ms relay timeout in a step 318. In a next step 320, if the detection time is 5 ms or more, then the detection timer is loaded with 5 ms in a step 322 and then the process goes to a next step 324. If the detection time is less than 5 ms, then the process goes directly to step 324.

In step 324, the detection timer starts to count down. A next step 326 checks to see if the detection timer has expired. Steps 318 through 326 provide time for the rest of the CCPEs on telephone line 120 to detect the on-hook condition and get in synchronization for the next step. Thus, the last CPE to enter the on-hook condition in step 312 resynchronizes all of the CCPEs on telephone line 120.

Once the detection timer has expired, in a step 330, control processor 270 checks to see if adjunct 112 is a part of a primary CCPE. If adjunct 112 is a part of a primary CCPE, then in a step 332, control processor 270 loads a timer for 30 ms and asserts the -TERMINATE_LINE signal (i.e., setting the primary CCPE off-hook) and the CAS_DET signal. The primary CCPE going off-hook maintains the connection with the central office and allows adjunct 112 to communicate with the central office to receive the CID information.

In a next step 334, the timer is checked to see if the 30 ms has expired. Step 334 provides time for telephone line 120 voltage to stabilize after the entering the off-hook condition.

Once the timer has expired, in a next step 336, control processor 270 asserts the GEN_DTMF signal to enable DTMF generator 280. Control processor 270 also loads the timer with 10 ms as a timeout for receive the DTMF_ACK signal from DTMF generator 280. In steps 338 and 340, control processor 270 checks to see if DTMF generator 280 has asserted the DTMF_ACK signal within 10 ms after control processor 270 asserted the GEN_DTMF signal. If the DTMF_ACK signal is asserted, then in a step 342 control processor 270 asserts the DTMF_LATCH signal, which causes DTMF generator 280 to generate the CAS ACK signal. In steps 344 and 346, control processor checks to see if DTMF generator 280 deasserts the DTMF_ACK signal. If the DTMF_ACK signal is deasserted, then in a step 348, control processor 270 deasserts the DTMF_LATCH signal and reloads the timer for 64 ms. Steps 348 and 350 allow DTMF generator 280 to generate the CAS ACK signal for 64 ms. Once the 64 ms timeout is expired, in steps 352 and 354, control processor 270 reloads the timer for a 20 ms timeout. Thus, the elapsed time from step 332 to the end of step 354 is approximately 114 ms.

However, if DTMF generator 280 does not assert the DTMF_ACK signal (step 340) and deassert the DTMF signal (step 346) within 10 ms, the process moves directly to step 348 to provide a controlled exit.

Referring back to step 330, if adjunct 112 is part of a secondary CCPE, in steps 360 and 361, control processor 270 asserts the CAS_DET signal and starts a 114 ms timeout. Control processor does not assert the -TERMINATE_LINE signal and, thus, adjunct 112 does not go off-hook.

The process moves to a next step 370 (the secondary CCPE branch) from step 362 and from step 354 (the primary CCPE branch). The primary CCPE and the secondary CPPE(s) enter step 370 at approximately the same time because the primary CCPE branch and the secondary CCPE branch each take approximately 114 ms. In step 370, control processor 270 deasserts the CAS_DET signal and starts a 510 ms data window timer and a 120 ms cd valid timer. In a next step 372, control processor 270 checks to see if the -CD signal has been asserted, indicating that the carrier signal for the FSK CID information signal from the central office has been detected. If the carrier is not present, in a next step 373, control processor 20 restarts the 120 ms cd valid timer. In a next step 374, control processor checks 270 to see if the data window timer has expired. If the data window timer has not expired, the process returns to step 372.

However, if in step 372, the carrier is present, in a step 376, control processor 270 checks to see if the cd valid timer is expired. If the cd valid timer is not expired, the process returns to step 272. However, if the cd valid timer is expired, in a step 377, control processor 270 checks to see if the carrier is still present. Step 377 is repeated until the carrier is no longer present to allow the entire FSK CID information to be received, even if the cd valid timer is expired.

After both steps 374 and 377, the process moves to a step 380. In step 380, control processor 270 deasserts the -RELAY_OUT signal to connect the house telephone and start a 20 ms timeout to allow the voltage to the house phone to stabilize. A next step 381 then checks to see if the 20 ms timeout has expired. After the 20 ms timeout has expired, in a step 382, control processor 270 then deasserts the -TERMINATE_LINE signal and the CAS_DET signal. Then the process returns to step 300 to monitor for the next off-hook condition.

Figure 4:
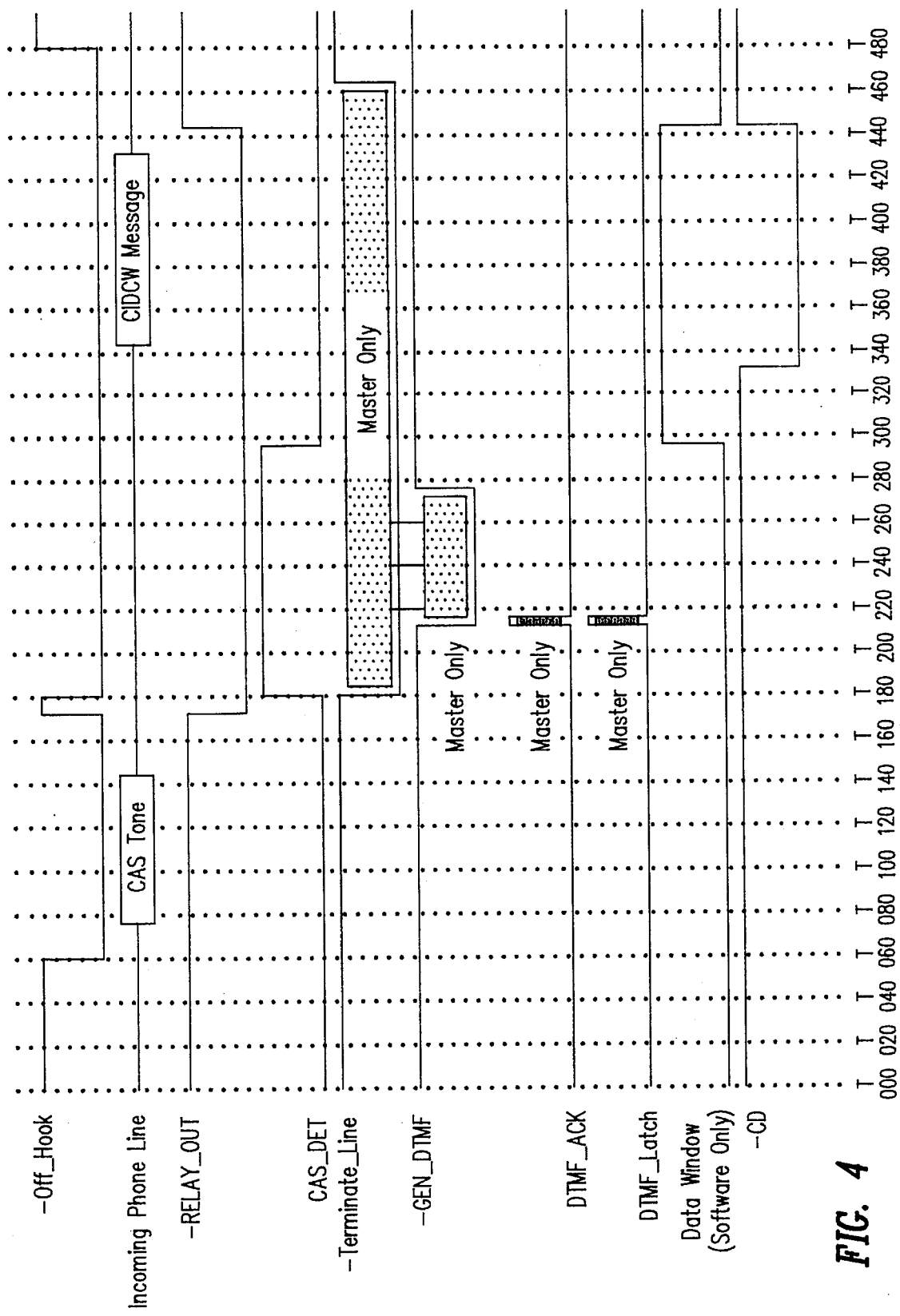
FIG. 4 shows a timing diagram illustrating signal timing of some of the signals depicted in FIGS. 2 and 3.

FIG. 4 shows an exemplary timing diagram for illustrating part of the CIDCW operation. The following description makes reference to the appropriate step in the flow diagram of FIG. 3.

In this example, all CPEs on telephone line 120 (FIG. 1) are initially on-hook, which is indicated by the -OFF_HOOK signal being at a high level. Control processor 270 monitors telephone line 120 for an off-hook condition (step 302).

At about time T060, a user begins using a CPE to communicate with a second party, causing the -OFF_HOOK signal to go low, which control processor 270 detects (step 302). In this example, at approximately time T070, the central office transmits a CAS tone to telephone line 120. Each CCPE on the telephone line detects the CAS tone (step 306) and at about time T170, each CCPE goes on-hook (step 308). After a 20 ms timeout, control processor 270 asserts the -RELAY_OUT signal, to disconnect the CCPE's house telephone from telephone line 120 (step 312). When LIU 260 detects all of the CPEs are on-hook (step 314), the -OFF_HOOK signal is deasserted, which in this example occurs at approximately the same time that control processor 270 asserts the -RELAY_OUT signal.

At approximately time T180, control processor 270 (in all of the CCPEs on telephone line 120) then asserts the CAS_DET signal (steps 332 and 360). The primary CCPE also asserts the -TERMINATE_LINE signal, thereby causing the primary CCPE to go off-hook (step 332). Consequently, LIU 260 (in all of the CCPEs on telephone line 120) detects the off-hook condition on telephone line 120 and asserts the -OFF_HOOK signal.

Control processor 270 in the secondary CCPEs also performs a 114 ms timeout (step 360). However, control processor 270 in the primary CCPE asserts the -GEN_DTMF signal received by DTMF generator 280 after a 30 ms timeout at about time T210 (steps 334 and 336). Almost immediately thereafter, DTMF generator 280 responds by asserting the DTMF_ACK signal. Control processor 270 then responds almost immediately thereafter by asserting the DTMF_LATCH signal, which causes DTMF generator 280 to generate the CAS ACK signal (steps 340 and 342). Control processor then performs a 64 ms timeout (step 350). As a result, at about time T270, control processor 270 deasserts the -GEN_DTMF signal to end transmission of the CAS ACK signal and starts a 20 ms timeout (step 352).

Then at about time T294, all CCPEs on telephone line 120 deassert the CAS_DET signal and start a 510ms data window timer and a 120 ms cd valid timer (step 370). Control processor 270 then monitors the -CD signal to detect when the central office is transmitting the carrier signal for the CID information (step 372). If no carrier is detected, the 120 ms cd valid timer is reset. In this example, data reception circuit 240 asserts the -CD signal at approximately time T330.

The central office begins transmitting the CID information on telephone line 120 at about time T345, which is received by custom controller 230 via data reception circuit 240. Control processor monitors the -CD signal and the 120ms cd valid timer while receiving the CID information (steps 372 and 376). The CID information is normally completely received before the 120 ms cd valid timer has expired and, thus, the central office stops transmitting the carrier signal. As a result, data reception circuit 240 deasserts the -CD signal, which in this example, occurs at approximately time T445. Control processor detects when the -CD signal is deasserted (step 377) and in response, deasserts the -RELAY_OUT signal to reconnect the CCPE's house telephone and starts a 20 ms timeout (step 380). When the 20 ms timeout expires at about time T465, the primary CCPE deasserts the -TERMINATE_LINE signal (step 382) and the process returns to the initial starting point. In this example, at about time T480, the user(s) end the call and telephone line 120 enters the on-hook condition.

Figure 5B:
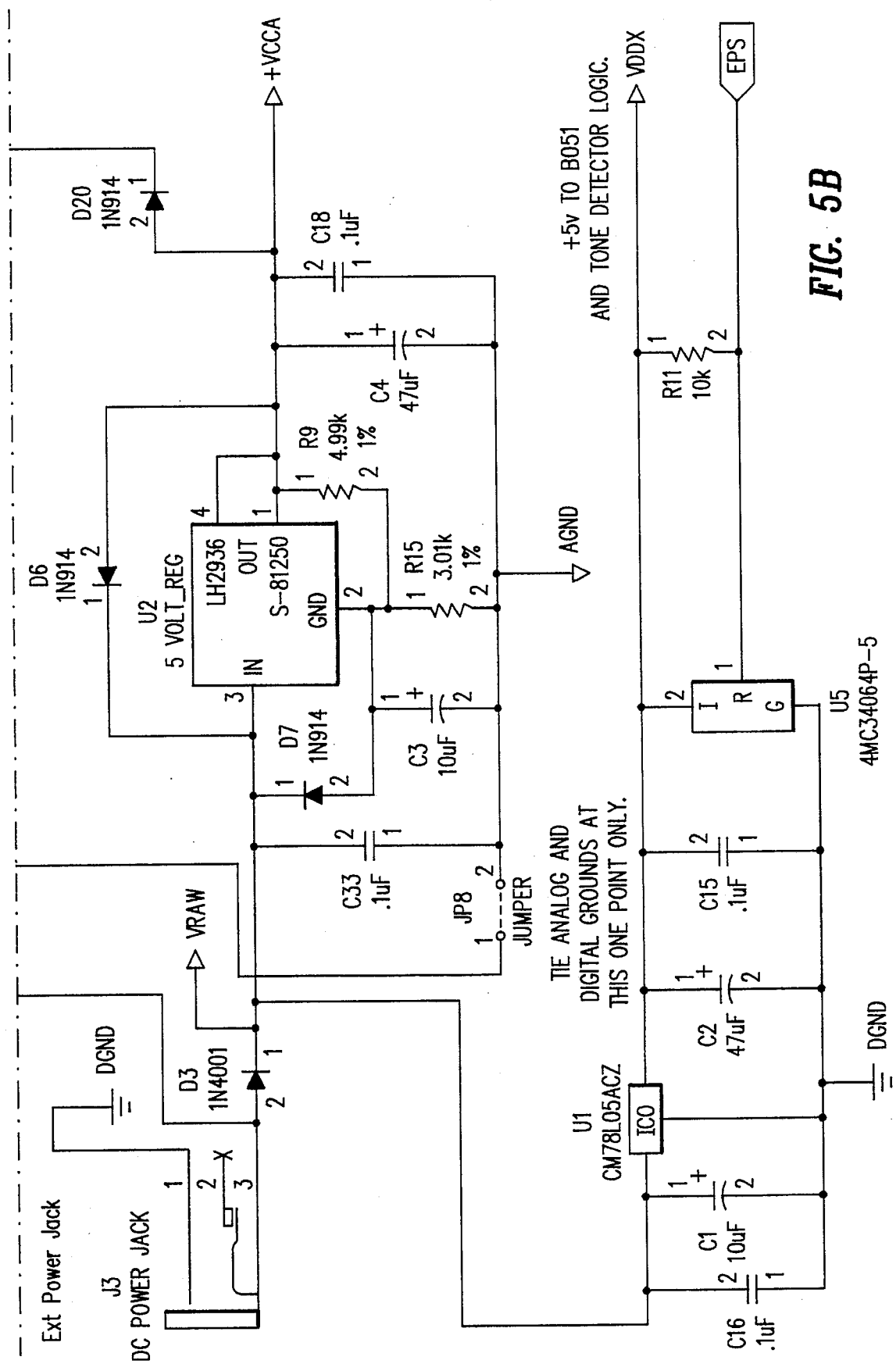
FIG. 5 shows a schematic diagram of one embodiment of the power supply depicted in FIG. 2.

FIG. 5 shows a schematic diagram of one embodiment of power supply 295 (FIG. 2). Connector J3 is used to couple power supply 295 to an AC adapter (not shown). The AC adapter is coupled to an AC power source and supplies a DC output of approximately 12 volts to pin 3 of connector J3. Pin 3 of connector J3 is coupled to the input lead of 5 volt regulator U2 through diode D3. Regulator U2 can be a regulator such as a LM2936 available from National Semiconductor Corporation or a S-81250 regulator available from Seiko-Epson. The data sheet for the LM2936 regulator is herein incorporated by reference. Regulator U2 is coupled to capacitors C3, C4, C18 and C33, diodes D3, D6 and D7, and resistors R9 and R15 to provide a substantially constant supply voltage. Regulator U3 is configured to supply a voltage VCCA, which is substantially equal to 8 volts. Voltage VCCA is supplied to the analog circuitry of adjunct 112.

The input lead of regulator U2 is also coupled to an input lead of a regulator U1. Thus, regulator U1 also receives the DC output from the AC adaptor via diode D3. Regulator U1 is a LM78L05ACZ regulator. Regulator U1 is coupled to diode D3 and capacitors C1, C2, C15 and C16 in accordance with the data sheet for the LM78L05ACZ, which is herein incorporated by reference. Regulator U1 outputs on an output lead a voltage VDDX, substantially equal to 5 volts. The output lead of regulator U1 is coupled to control processor 270 and CAS tone filter circuit 275 (FIG. 2), thereby supplying voltage VDDX to control processor 270 and CAS tone filter circuit 275.

Detector U5 is also coupled to the output lead of regulator U1. Detector U5 is a MC34064P-5 detector. Resistor R11 is coupled to detector U5 according to the data sheet for the MC34064P-5, which is herein incorporated by reference. Resistor R11 serves as a pullup resistor on the output line of detector U5. Detector U5 monitors voltage VDDX and asserts the EPS signal when voltage VDDX drops below approximately 4.6 volts.

Pin 3 of connector J3 is also coupled to an input lead of a regulator U3 through a diode D2. Regulator U3 is also a LM2936 or S-81250 regulator and is coupled to diode D2 and capacitors C5, C6, C17 and C19 in accordance with the data sheet for the LM2936 regulator. Regulator U3 supplies a substantially constant voltage VDD. Voltage VDD is substantially equal to 5 volts and is supplied to the CID circuitry of adjunct 112. In addition, voltage VDD is impressed on the emitter of a PNP transistor Q12. Transistor Q12 serves as a pass transistor to output a voltage vX and is controlled by a -ENA signal transmitted by custom controller 230 (FIG. 2). Voltage VX is supplied to data reception circuit 240.

A schottky diode D19 has an anode coupled to the collector of transistor Q12, and a cathode coupled to a cathode of a diode D20. Diode D20 has an anode coupled to the output lead of regulator U2. Consequently, Voltage VX and voltage VCCA from regulator U2 are impressed on the anodes of diodes D19 and D20 respectively. When external power is adequate, voltage VCCA is approximately 8 volts, which is then output as voltage VXX by diode D20. The cathodes of diodes D19 and D20 are coupled together, outputting voltage VXX on an output lead 501. Thus, if voltage VCCA drops below approximately 5.6 volts, diode D19 becomes conductive and approximately 5 volts (i.e., voltage VX) is output on output lead 501. Voltage VXX is also supplied to data reception circuit 240 (FIG. 2).

Figure 6B:
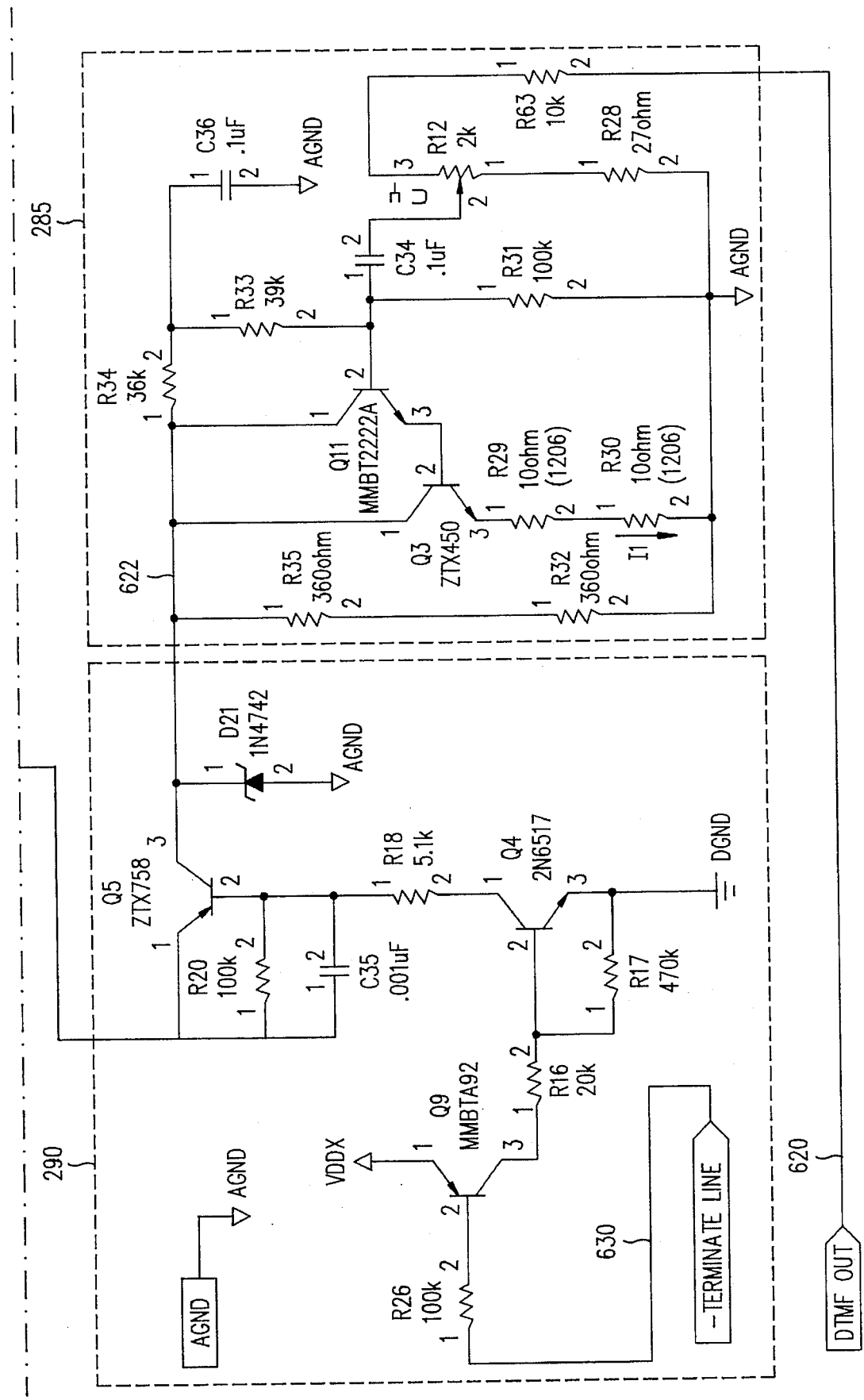
FIG. 6 shows a schematic diagram of one embodiment of the ring detector, polarity guard, line in use circuit, and phone line switch depicted in FIG. 2.

FIG. 6 shows a schematic diagram of one embodiment of ring detector 220, polarity guard 265, LIU 260, phone line switch 290 and line hold circuit 285 (FIG. 2).

Ring detector 220 is a conventional ring detector circuit that generates the -RING signal via an optical isolator U6. Optical isolator U6 provides isolation between the CPE and telephone line 120. When the central office sends a ring signal to telephone line 120 (which is in the on-hook condition), an AC current flows between the tip line and the ring line, thereby causing optical isolator U6 to couple the output lead 601 of ring detector 220 to an internal return (DGND) of ring detector 220. As a result, the -RING signal is asserted, indicating an incoming call.

Polarity guard 265 has a first input lead coupled to the tip line and a second input lead coupled to the ring line. Polarity guard 265 is a conventional full wave bridge circuit, which outputs a positive voltage (i.e., the voltage across telephone line 120) on a line 603 even when the ring and tip lines are reversed due to miswiring.

LIU 260 has a resistors R19, R64 and R21 connected in series with line 603. The equivalent resistance of resistors R19, R64 and R21 is approximately equal to 30MΩ, which meets the isolation requirements of most telephone operating systems. Resistors R19, R64, R21, R22 and R24 form a voltage divider so that when the voltage on line 603 is above approximately 18 volts, the voltage at node 605 is above 8 volts. Diode D22 has an anode connected to node 605 and a cathode connected to the VCCA source (i.e., 8 volts). As a result, diode D22 conducts. Because diode D22 is coupled between the base and emitter of a darlington pair 606 formed by PNP transistors Q7 and Q8, darlington pair 606 is shut off. The output of lead of darlington pair 606 is coupled to the base of transistor Q10 through resistor R23. Because darlington pair 606 is off, no base current flows in transistor Q10, thereby turning off transistor Q10. The collector of transistor Q10 is coupled to a node 607. Node 607 is coupled output lead 609 and to the VDDX voltage source through a resistor R27. Because transistor Q10 is off, resistor R27 pulls up the voltage at node 607 (and thus, output lead 609). As a result, the -OFF_HOOK signal is at a logic 1 level indicating an on-hook condition.

On the other hand, if the voltage at node 605 is below approximately 18 volts, diode D22 does not conduct and the base-emitter junctions in darlington pair 606 are forward biased. Thus, darlington pair 606 conducts current to the base of transistor Q10, which causes transistor Q10 to conduct. Resistor R23 couples the base and emitter of transistor Q10 to provide a path for leakage current. A diode D23 is coupled between node 607 and a node 611 (between resistors R22 and R24), with the anode of diode D23 coupled to node 611. Diode D23 helps in causing the voltage at node 607 to rise and fall more quickly when telephone line 120 transitions from the on-hook condition to the off-hook condition and vice versa to create hysteresis to reduce chattering on the -OFF_HOOK signal.

As a result, LIU 260 detects whether the voltage of line 266 (i.e., the telephone line voltage) is above a threshold voltage. In this embodiment, the threshold voltage is approximately 18 volts because the voltage of telephone line 120 is at the telephone line battery voltage (typically 48 volts for normal telephone systems or 24 volts for subscriber line concentrator systems) when all the CPEs on telephone line 120 are on-hook, whereas the telephone line voltage is between 2 to 12 volts when a CPE is off-hook. Thus, a 18 volt voltage threshold provides good noise margin for detecting when a CPE is off-hook.

Line hold circuit 285 receives the DTMF_OUT signal from DTMF generator 280 (FIG. 2) at an input lead 620. The DTMF_OUT signal is the CAS ACK signal to be transmitted to the central office in response to a CAS tone. NPN transistors Q3 and Q11, capacitors C34 and C36, and resistors R63, R28, R12, R31, R29, R30, R32, R35 and R36 form both a coupling circuit used in coupling the DTMF_OUT signal to telephone line 120 and a hold circuit for maintaining the connection with the central office.

For the coupling function, resistor R12 is trimmed to adjust the output signal generated at the tip and ring lines to meet the amplitude requirements set by the telephone operating system.

For the hold function, resistors R35 and R32 are coupled in series between output lead 622 and a ground source. As a result, resistors R35 and R32 in parallel with the rest of line hold circuit 260 form a load of approximately 600Ω to emulate the AC impedance of a telephone. Resistors R31, R29, R30 and R36 bias transistors Q3 and Q11 to conduct a substantially constant current I1. Current I1, together with the current conducted through resistors R35 and R32, meet the holding current requirements of the telephone operating system. Thus, when phone line switch 290 couples output lead 622 of line hold circuit 285 to telephone line 120 (via polarity guard 265), the central office "sees" an off-hook CPE and does not disconnect the call while the CAS ACK signal is being transmitted to the central office.

Phone line switch 290 receives the -TERMINATE_LINE at an input lead 630. A resistor R26 couples input terminal 630 to the base of a PNP transistor Q9. The emitter of transistor Q9 is coupled to the VDDX source, whereas the collector of transistor Q9 is coupled to the base of a NPN transistor Q4. As a result, when the -TERMINATE_LINE signal is asserted, transistor Q9 conducts a base current to transistor Q4, thereby causing transistor Q4 to conduct. Any leakage current of transistor Q4 or Q9 is conducted away by a resistor R17 between the base and emitter of transistor Q4.

The collector of transistor Q4 is coupled to the base of a PNP transistor Q5 via a resistor R18. The emitter and collector of transistor Q5 are coupled to polarity guard output lead 603 and to line hold circuit output lead 622, respectively. Consequently, when transistor Q4 conducts, base current is conducted from transistor Q5, thereby causing transistor Q5 to conduct and pass the holding current and the DTMF_OUT signal to the tip and ring lines via polarity guard 265.

Figure 7B:
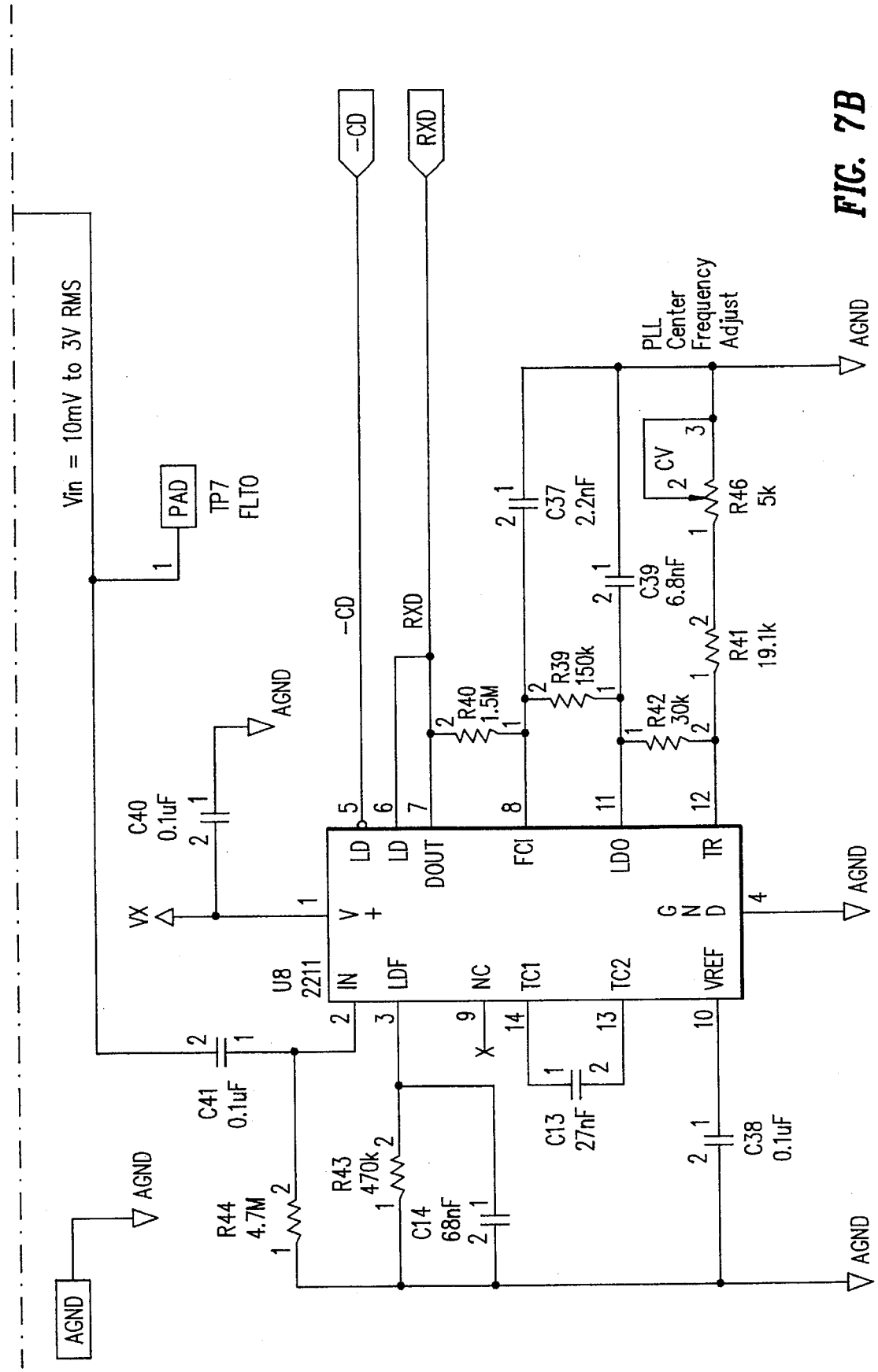
FIG. 7 shows a schematic diagram of one embodiment of the data reception circuit depicted in FIG. 2.

FIG. 7 shows a schematic diagram of one embodiment of data reception circuit 240 (FIG. 2). Data reception circuit 240 generates the TONE_OUT signal by filtering and amplifying signals on the tip and ring lines to pass a frequency band containing the CAS tone.

Data reception circuit 240 is coupled to the tip and ring lines via capacitors C11 and C12. Capacitors C11 and C12 provide the isolation from telephone line 120 required by the telephone operating system. Further, capacitors C11 and C12 and resistor R61 form a high pass filter. This high pass filter is cascaded with a low pass filter formed by capacitors C50, C51 and C49 and resistors R59 and R60, thereby passing primarily the frequency band containing the CAS tone and CID information transmitted from the central office.

The low pass filter is cascaded with an amplifier U7A through resistors R57 and R58, thereby amplifying any signals within the band. Amplifier U7A can be a LM358 amplifier, the data sheet of which is herein incorporated by reference. Capacitors C44 and C46 together with resistors R49 and R50 coupled between the VXX voltage source and the analog ground source serve to provide a substantially noise-free bias point for amplifier U7A. Diodes D15–D17 clamp the input signals to amplifier U7A for protection.

Amplifier U7A is cascaded with a high pass filter 710 formed by another LM358 amplifier U7B and capacitors C47, C48, and C45, and resistors R51–R54. The output signal generated by high pass filter 710 is the TONE_OUT signal transmitted to CAS tone filter circuit 275.

High pass filter 710 is cascaded to a low pass filter 720 and a phase locked loop ("PLL") device U8. Low pass filter 720 is formed by capacitors C42 and C43, resistors R45, R47 and R48, and a NPN transistor Q13 connected as an emitter follower. PLL device U8 can be a XR2211 PLL, which is configured with capacitors C13, C14 and C37–C41 and resistors R39–R44 and R46 in accordance with the data sheet for the XR2211 PLL, which is herein incorporated by reference. Resistor R46 can be trimmed to adjust the PLL center frequency to the frequency of the FSK carrier signal from the central office. PLL device U8 asserts the -CD signal transmitted to custom controller 230 and control processor 270 when PLL device U8 detects the carrier signal. PLL device U8 also outputs the CID information to custom controller 230 via the RxD signal.

Figure 8A:
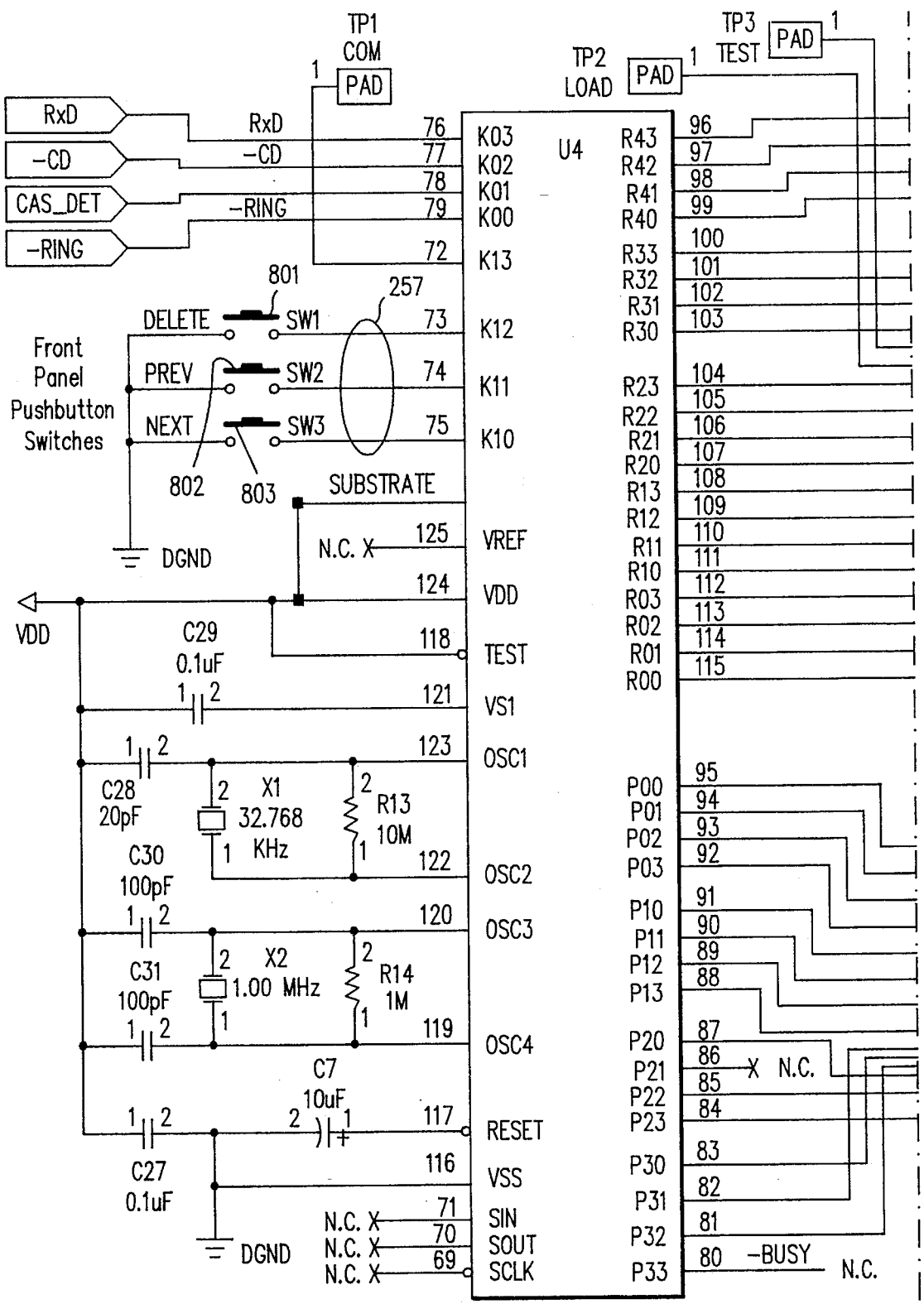
FIG. 8 shows a schematic diagram of one embodiment of the 4-bit custom controller depicted in FIG. 2.
Figure 8B:
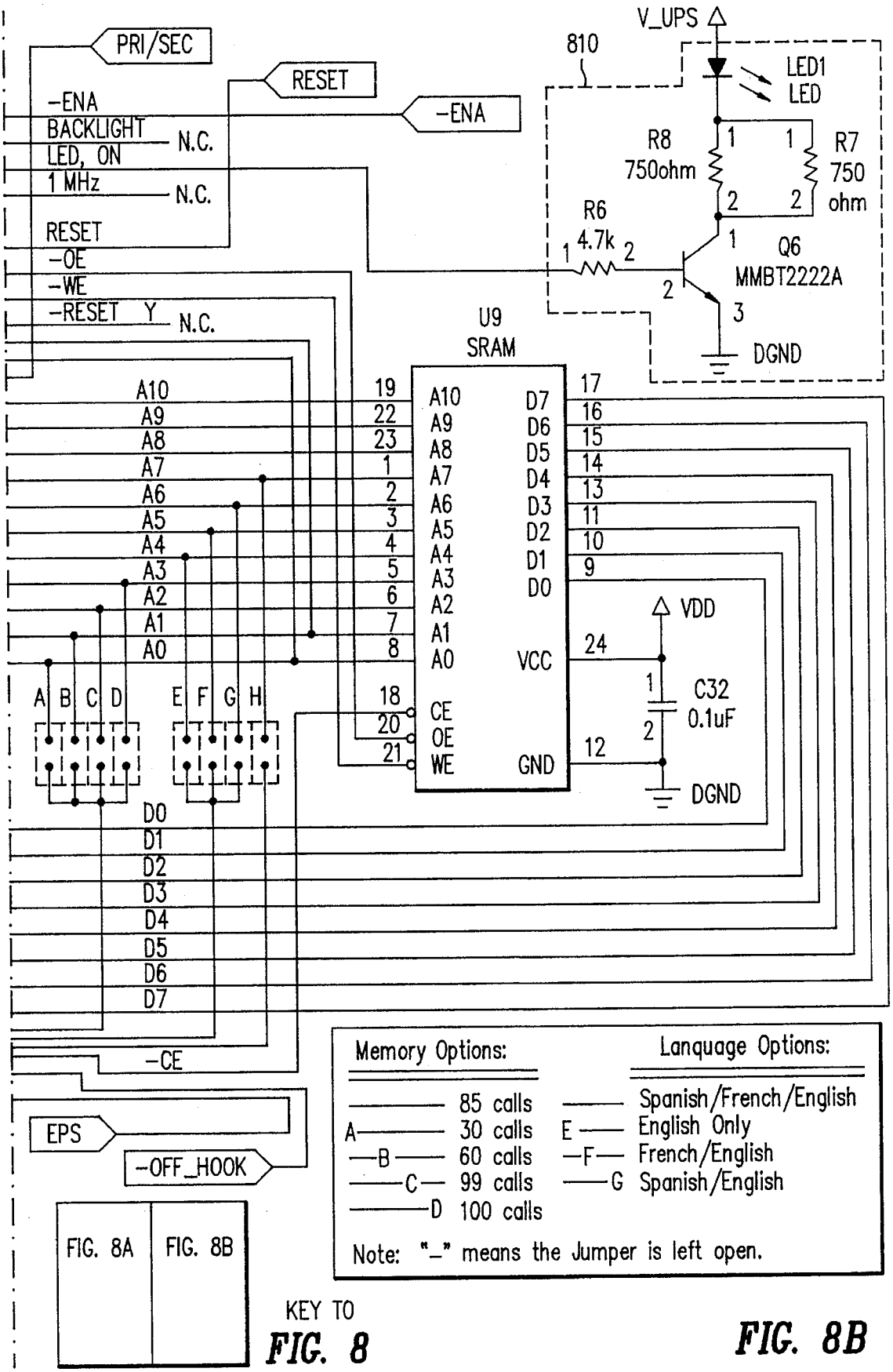

FIG. 8 shows a schematic diagram of one embodiment of custom controller 230 (FIG. 2). Custom controller 230 receives the RxD and -CD signals from data reception circuit 240 as described above. Custom controller 230 also receives the CAS_DET signal from control processor 270, the -RING signal from ring detector 220, the -OFF_HOOK signal from LIU 260 and the EPS signal from power supply 295.

In response to an assertion of the EPS signal, custom controller 230, after a short delay, stops asserting a RESET signal to initiate a controlled reset of control processor 270 (e.g., during power up).

Custom controller 230 comprises a 4-bit controller U4, such as a 624C microcontroller available from S-MOS Systems, Inc. Part of controller U4 is shown in FIG. 3. Controller U4 has OSC1 and OSC2 input leads coupled to crystal X1, resistor R13 and capacitor C28 to receive a 32,768 KHz clock signal in accordance with the data sheet for the SMOS 624C microcontroller, which is herein incorporated by reference. Controller U4 also has OSC3 and OSC4 input leads coupled to crystal X2, resistor R14 and capacitors C30 and C31 to receive a 1.0 MHZ clock signal.

Controller U4 is coupled to key circuit 255 via lines 257. The user asserts the DELETE, PREV and NEXT signals by actuating pushbutton switches 801–803, respectively. In response to the DELETE, PREV and NEXT signals, controller U4 can access a SRAM U9 coupled to controller U4. Controller U4 can also respond to the DELETE, PREV and NEXT signals to configure adjunct 112 as either a primary or secondary CCPE, configure memory options that allow for storing 30, 60, 85, 99 or 100 calls, and the language options that allow display of messages in different combinations of Spanish, French, or English languages. Optionally, the memory and language modes can be set by appropriate connections of jumpers A-G, and the H jumper can be used to configure adjunct 112 as either a primary or secondary CCPE. Controller U4 asserts a LED.ON signal to indicate when a message is stored in SRAM U9. Source code executed by controller U4 for configuring adjunct 112 as a primary or secondary CCPE is contained within the APPENDIX 2 "Primary_Sec", which is a part of this application and herein incorporated by reference in its entirety.

A LED circuit 810 is coupled to receive the LED.ON signal, and conducts current through diode LED1 when the LED.ON signal is asserted.

Custom controller 230 is programmed to respond to the RxD and -CD signals from data reception circuit 240, the CAS DET signal from control processor 270, the -RING signal from ring detector 220, the -OFF_HOOK signal from LIU 260 as described in conjunction with FIGS. 2–4.

Figure 9A:
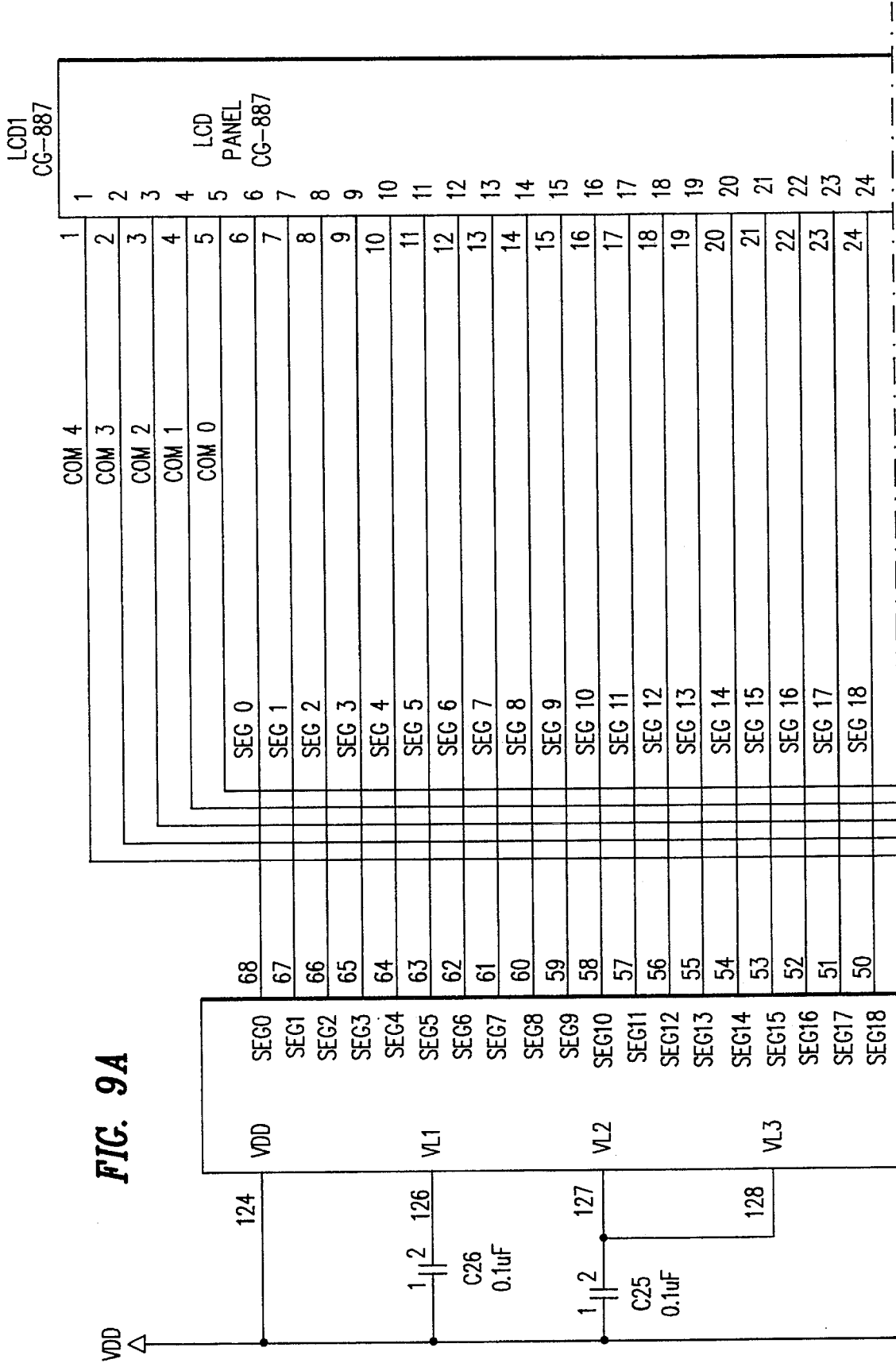
FIG. 9 shows a schematic diagram of one embodiment of the LCD depicted in FIG. 2.
Figure 9B:
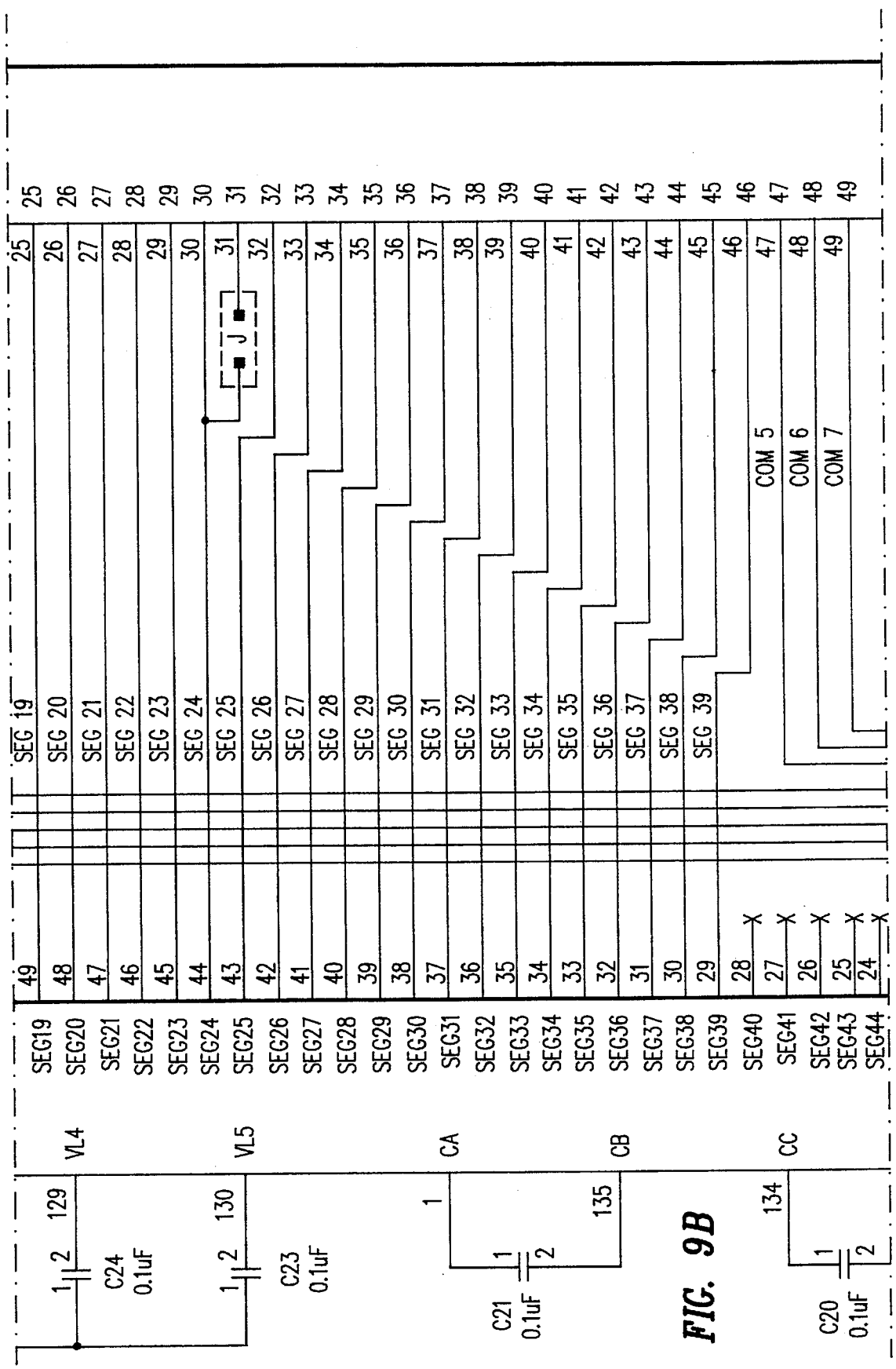

FIG. 9 shows a schematic diagram of the part of controller U4 coupled to LCD 250. Controller U4 is coupled to lines 252 which carry the segment and common drive signals to LCD 250. Capacitors C20–C26 are coupled to controller U4 to boost the voltage of the drive signals that controller U4 generates on lines 252. In the conventional manner, controller U4 drives the appropriate lines of lines 252 to cause LCD 250 to display the CID information received from the central office via data reception circuit 240 and signal RxD.

Figure 10B:
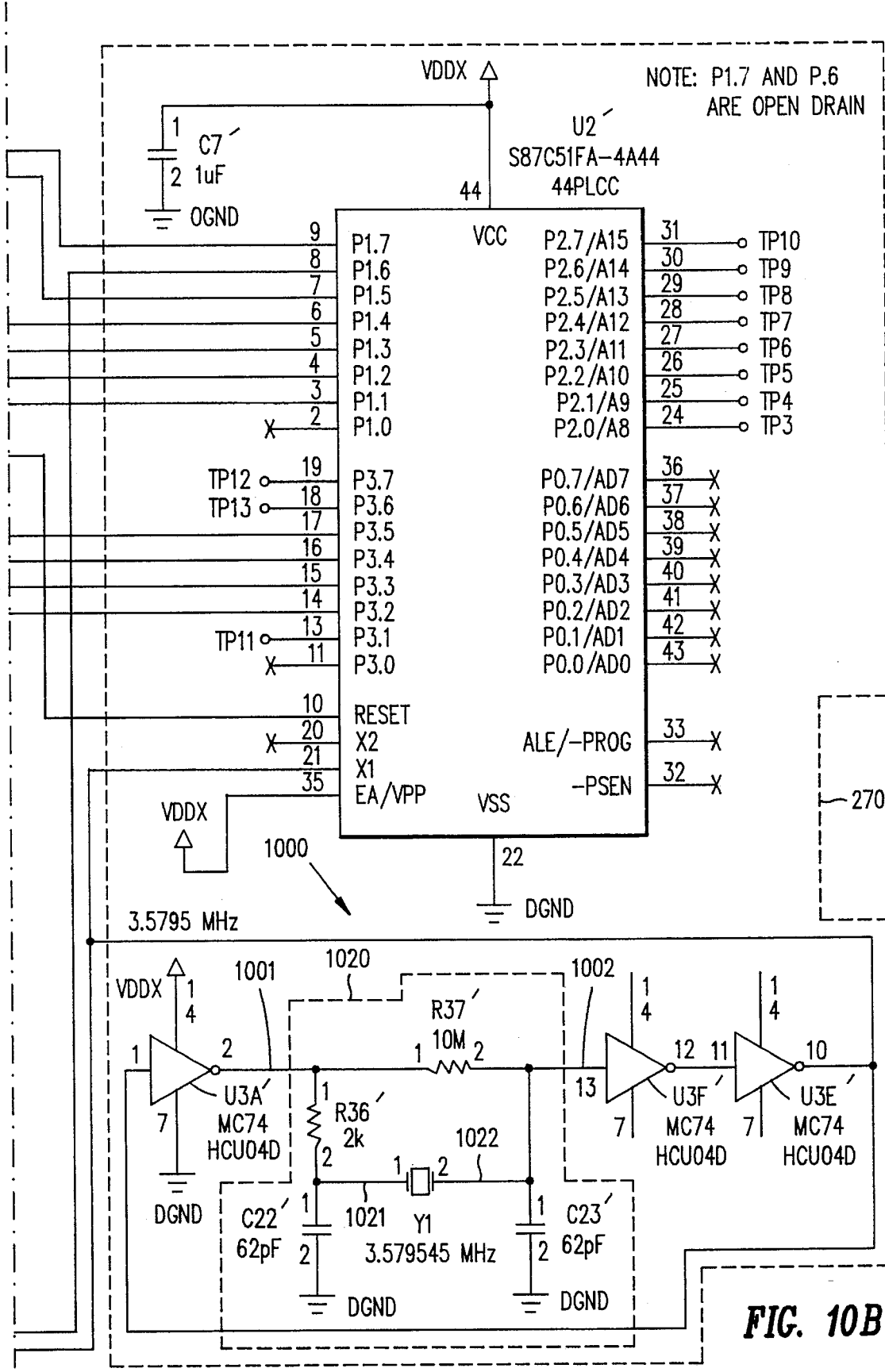
FIG. 10 shows a schematic diagram of one embodiment of the 8-bit control processor depicted in FIG. 2.

FIG. 10 shows a schematic diagram of one embodiment of control processor 270 and DTMF generator 280 (FIG. 2). In this embodiment, the circuitry shown in FIG. 10 is mounted on a daughter board, whereas the circuitry shown in FIGS. 4–9 are mounted on a mother board. The daughter board is connected to the mother board via connectors P4–P6.

Control processor 270 comprises a processor U2' and a clock generator 1000. Control processor can be an 8-bit microprocessor such as a 87C51FA, the data sheet of which is herein incorporated by reference.

Clock generator 1000 is a conventional clock generator circuit comprising cascaded inverting amplifiers U3A', U3F' and U3E' with a oscillating subcircuit 1020.

The output lead 1001 of inverting amplifier U3A' is coupled to the input lead 1002 of inverting amplifier U3F' through a crystal oscillator subcircuit 1020. Crystal oscillator subcircuit 1020 includes a crystal Y1. First and second leads 1021 and 1022 of crystal Y1 are coupled to a digital ground source through capacitor C22' and C23', respectively. First lead 1021 is coupled to the output lead 1001 through a resistor R36' and the input lead 1002 through resistor R36' and a resistor R37'. Second lead 1022 is coupled to input lead 1002. The output lead of inverting amplifier U3F' is coupled to the input lead of inverting amplifier U3E', whereas the output lead of inverting amplifier U3E' is coupled to the input lead of inverting amplifier U3A'. Clock generator 1000 generates a 3.5795 MHz clock signal for operating processor U2' and DTMF generator 280.

Processor U2' is coupled to receive the PRI/-SEC signal from custom controller 230, the -OFF_HOOK signal from LIU 260, the -CD signal from data reception circuit 240, and the 2130 and 2750 signals from CAS tone filter circuit 275. The CAS tone detection circuitry (which includes data reception circuit 240, control processor 270, and CAS tone filter circuit 275) is disclosed in the contemporaneously filed application "METHOD AND STRUCTURE FOR DETECTING A CUSTOMER PREMISES EQUIPMENT ALERTING SIGNAL" application Ser. No 08/387,666, by Michael T. Mathews, which is incorporated herein by reference.

Processor U2' is programmed to output the -TERMINATE_LINE signal to phone line switch 290, the CAS_DET signal to custom processor 230, and the -RELAY_OUT signal to relay K1 as described above in conjunction with FIGS. 2–4.

Processor U2' is also programmed to generate the handshake signals -GEN_DTMF and DTMF_LATCH transmitted to DTMF generator 280. DTMF generator 280 includes a tone generator U4', such as DTMF tone generator UMC 91531/A. Tone generator U4' is configured to generate a DTMF "D" tone, in accordance with the data sheet for the UMC 91531/A, which is herein incorporated by reference.

DTMF generator 280 responds to the assertion of the -GEN_DTMF signal by asserting the DTMF_ACK signal transmitted back to processor U2', which indicates that tone generator U4' is ready to generate the DTMF_OUT (i.e., CAS ACK) signal. Processor U2' responds to the assertion of the DTMF_ACK signal by asserting the DTMF_LATCH signal received by tone generator U4'. Tone generator then generates the DTMF "D" tone as the DTMF_OUT signal.

The foregoing has described the principles and preferred embodiments of the present invention. However, the invention should not be construed as being limited to the particular embodiments described. For example, different devices can be used from the controllers, processors, PLLs, and tone generators described herein. Also, different devices may be used to present the CID information to the user(s), including computers, audio systems or other signaling devices. Further, some functions can be combined in a custom digital processing chip. Thus, above-described embodiments should be regarded as illustrative rather than restrictive. Variations can be made to those embodiments by workers skilled in the art without departing from the scope of the present invention as defined by the following claims.

APPENDIX 1

Copyright 1995, CIDCO Inc. All Rights Reserved

```
                    Copyright 1995, CIDCO Inc. All Rights Reserved
;****************************************************************************
;*                                                                          *
;*                              scwid_control                               *
;*                                                                          *
;*      Monitors the inputs for the phone going off hook, then waiting      *
;*      for CAS tones, and then sending the ACK back, and then waiting      *
;*      for the message to be received.                                     *
;*                                                                          *
;*      See External Design Documentation for flowcharts and descriptions.  *
;*                                                                          *
;**************************************************************************** scwid_control:
      jb     off_hook_detect, turn_cas_det_off   ; if not off hook, then finished
      clr    off_hook_valid                      ; set output to off hook
      jnb    hit_detect_flag, keep_waiting       ; if no tones, then finished
      mov    wait_timeout, #WAIT_20MS            ; 20 ms of sync time still_off_hook:
      mov    a, wait_timeout                     ; has 20 ms expired ?
      jz     go_on_hook                          ; if so branch
      mov    signals_in, P1                      ; get inputs again
      jnb    off_hook_detect, still_off_hook     ; if phone is on hook, then branch go_on_hook:
      clr    discnect_house_phon                 ; get control from house phone
      mov    wait_timeout, #WAIT_65MS            ; keep relay open for 65 ms before checking hook
      jmp    wait_for_relay_timeout              ; skip next instructions turn_cas_det_off:
      setb   off_hook_valid                      ; set output to on hook
      clr    cas_det                             ; clear adjunct/8051 handshake line
      clr    hit_detect_flag                     ; clear check for hits/sqwid control handshake flag keep_waiting:
      ret                                        ; finished wait_for_relay_timeout:
      mov    signals_in, P1                      ; get inputs again
      jb     off_hook_detect, calc_sync_time     ; if phone is on hook, then branch
      mov    a, wait_timeout                     ; has relay been open long enough to check hook status
      jnz    wait_for_relay_timeout              ; if not, branch
      jmp    release_relay                       ; if after 65ms and still not on hook give up calc_sync_time:
      mov    a, wait_timeout                     ; see how long detection took
      clr    c                                   ; clear carry
      subb   a, #WAIT_05MS                       ; detection_time >= 5ms
      jc     wait_for_sync                       ; if not, use remainder of time
      mov    wait_timeout, #WAIT_05MS            ; else use 5ms to wait
      jmp    wait_for_sync                       ; wait for timeout wait_for_sync:
      mov    a, wait_timeout                     ; has time expired
      jnz    wait_for_sync                       ; if not keep checking
      setb   cas_det                             ; enable cas detection signal
      jnb    mode, do_slave_wait                 ; else check for me first, if not me first branch
      clr    term_line                           ; terminate the line
      mov    wait_timeout, #WAIT_30MS            ; wait 30 ms before emitting tone wait_for_seize_timeout:
      mov    a, wait_timeout                     ; has time expired ?
      jnz    wait_for_seize_timeout              ; if not, branch
      clr    gen_dtmf                            ; begin generation of DTMF
      mov    wait_timeout, #WAIT_10MS            ; DTMF handshaking should be less than 10ms wait_for_DTMF_ack:
      mov    a, wait_timeout                     ; if DTMF chip is not connected or responding
      jz     start_DTMF_fail_abort               ; timeout after 10ms
      mov    signals_in, P1                      ; get inputs again
      jnb    DTMF_ACK, wait_for_DTMF_ack         ; wait for ack signal to go high
      setb   DTMF_latch                          ; begin generation wait_for_DTMF_clear:
      mov    a, wait_timeout                     ; if DTMF chip is not connected or responding
      jz     start_DTMF_fail_abort               ; timeout after 10ms
      mov    signals_in, P1                      ; get inputs again
      jb     DTMF_ACK, wait_for_DTMF_clear       ; wait for ack signal to go low start_DTMF_fail_abort:
      clr    DTMF_latch                          ; clear latch
```

```
        mov     wait_timeout, #WAIT_64MS            ; generate DTMF for 64 ms wait_for_dtmf_timeout:
        mov     a, wait_timeout                     ; has time expired ?
        jnz     wait_for_dtmf_timeout               ; if not, branch
        setb    gen_dtmf                            ; turn off DTMF
        mov     wait_timeout, #WAIT_20MS            ; for 20 ms wait for PLL to stabilize wait_for_stabilize_timeout:
        mov     a, wait_timeout                     ; has time expired ?
        jnz     wait_for_stabilize_timeout          ; if not, branch
        jmp     receive_wait                        ; else begin looking for carrier do_slave_wait:
        mov     wait_timeout, #WAIT_114MS           ; do not start watching for carrier for 90ms wait_for_slave_timeout:
        mov     a, wait_timeout                     ; has time expired ?
        jnz     wait_for_slave_timeout              ; if not, branch receive_wait:
        clr     cas_det                             ; disable cas detection signal
        mov     wait_timeout, #WAIT_255MS           ; set initial timeout for carrier detect to happen
        mov     carrier_timer, #WAIT_120MS          ; start continuous carrier detect timer look_for_initial_carrier:
        mov     signals_in, P1                      ; get inputs again
        jnb     carrier_detect, carrier_present     ; if carrier is present, branch
        mov     carrier_timer, #WAIT_120MS          ; restart continuous carrier detect timer
        mov     a, wait_timeout                     ; check for timeout
        jnz     look_for_initial_carrier            ; if not timed out branch
        jb      not_detected, release_relay         ; if 510ms have expired, then timeout
        setb    not_detected                        ; set flag saying 255ms of the 510ms wait has expired
        mov     wait_timeout, #WAIT_255MS           ; set initial timeout for carrier detect to happen
        jmp     look_for_initial_carrier            ; otherwise release the relays carrier_present:
        mov     a, carrier_timer                    ; has there been 120ms of continous carrier
        jnz     look_for_initial_carrier            ; if not branch carrier_valid:
        mov     signals_in, P1                      ; refresh the carrier detect signal
        jnb     carrier_detect, carrier_valid       ; branch if still present release_relay:
        clr     not_detected                        ; clear 255 ms wait flag
        setb    discnect_house_phon                 ; return control to house phone mov     wait_timeout, #WAIT_20MS            ; let line settle befor unterminating wait_for_house_fon:
        mov     a, wait_timeout                     ; wait for 20ms timeout
        jnz     wait_for_house_fon setb    off_hook_valid                      ; set output to on hook
        setb    term_line                           ; unterminate the line
        clr     hit_detect_flag                     ; clear the hit detect flags
        call    init_CAS_detector                   ; initialize cas detector variables disable_cas_det:
        clr     cas_det                             ; validate the carrier detect end_control:
        ret                                         ; finished
```

APPENDIX 2

Copyright 1995, CIDCO Inc. All Rights Reserved

```
;**********************************************************************
;*                                                                    *
;*   CIDCO Inc.                                                       *
;*   220 Cochrane Circle                                              *
;*   Morgan Hill, CA 95037                                            *
;*                                                                    *
;*   Source code for the selection of Primary/Secondary (Master/Slave) option *
;*                                                                    *
;**********************************************************************
;*       WARNING:   Proprietary Information Notice                    *
;*                                                                    *
;*       This software/firmware, related manual or information, and all *
;*   techniques, algorithms, screen displays and procedures or processes *
;*   embodied therein are the exclusive property and trade secrets of *
;*   CIDCO Inc. of Morgan Hill, California.  Unauthorized use, reproduction *
;*   or derivation is prohibited.  Removal or alteration of this and any *
;*   other copyright, trademark, or patent notice is unauthorized.    *
;*                                                                    *
;*       Copyright 1995, CIDCO Inc.  All rights reserved.             *
;**********************************************************************

;======================================================================
;Primary_Sec
;   Next query user for Primary/Secondary (Master/Slave) option.
;
;   This option is critical when multiple CIDCW adjuncts are connected
;   on the same line.  The adjunct must 'ACK' the CAS tone before the CO
;   sends the CIDCW data.  If two adjuncts 'ACK' out of phase, who knows
;   what might happen.  Chances are the CO will not recognize it and no
;   data would be sent.
;
;   If 'Primary' is selected, R23 PRI/-SEC = 1, the adjunct will send the
;   'ACK' to the CO.  'Primary' is the default setting.
;
;   If 'Secondary' is selected, R23 PRI/-SEC = 0, the adjunct will NOT send
;   an 'ACK' to the CO, but will listen for the CIDCW data.
;
Primary_Sec:
;
;   First check jumper H to see if a primary/secondary choice is required
;   Primary is the default setting to this point
        LD    X,51h        ;F51, port R1 [A7, A6, A5, A4]
        LD    MX,0111b     ;F51, Check for jumper H (A7)
        LD    X,63h        ;F63, port P3 [-BUSY, H, (EFG), (ABCD)]
        FAN   MX,0100b     ;F63, sense jumper H bit P32
        JP    NZ,PRI_exit  ;H not made, skip selection, default to Primary CALZ  CLKFAST1     ;Shift to high speed operation ...
        CALZ  CLRLCD1
;
;   Display "EXT   MAIN" for Primary/Secondary selection
;   MAIN = Primary
;   EXT  = Secondary
;
        LINE  ' ','P','R','I',' ',' ',' ',' ',' ',' ',' ','S','E','C',' '
        LINE  ' ','S','E','C',' ',' ',' ',' ',' ',' ',' ','P','R','I',' '
        LINE  'M','A','I','N',' ',' ',' ',' ',' ',' ',' ','E','X','T',' '
        LINE  ' ','E','X','T',' ',' ',' ',' ',' ',' ',' ','M','A','I','N'
        CALZ  STRING1      ;transfer string to LCD
        CALZ  CLKSLOW1     ;downshift to 32 KHz osc ;   now debounce keys from language selection
PRI_LP:
        LD    X,42h        ;F42, port K1: [COM, /DEL, /PREV, /NEXT]
        LD    A,MX         ;read keys
        AND   A,0111b      ;keep the key values.
        CP    A,0111b      ;any key pressed?
        JP    NZ,PRI_LP    ;bra if any key still pressed.
;
;   No keys pressed, debounce timer of 50 ms
        LD    X,77h
        LD    MX,0010b     ;F77, stop/reset SWTMR
        OR    MX,0001b     ;F77, start it
PRI_LP1: LD   X,22h        ;F22, SWTMR 1/100 sec data reg
        CP    MX,5         ;F22, 1/100 sec data value = 5 (50ms) ?
        JP    C,PRI_LP1    ;Wait for 50ms
        CALZ  DLA50ms1     ;(not used because of -CD monitoring)
;
;   And make sure keys are still not pressed
        LD    X,42h        ;F42, port K1: [COM, /DEL, /PREV, /NEXT]
```

```
        LD   A,MX       ;read keys
        AND  A,0111b    ;keep the key values.
        CP   A,0111b    ;any key pressed?
        JP   NZ,PRI_LP  ;bra if any key still pressed.
;
;    Keys finally released, now scan for user selection
PRI_LP2:
        LD   X,42h      ;F42, port K1: [COM, /DEL, /PREV, /NEXT]
        LD   A,MX       ;read keys
        AND  A,0101b    ;mask off COM and /PREV.
        CP   A,0101b    ;/DEL (-Sec) or /NEXT (Pri) pressed?
        JP   Z,PRI_LP2  ;bra if no
;
;    some key was pressed ...
;
        CP   A,0001B    ;Left key pressed (Secondary)?
        JP   NZ,PRI_exit ;Jump if not, already initialized to Primary
;
;    Secondary selected, so set output to reflect that.  Output was initialized
;    to primary.
        LD   X,52h      ;F52 = port R2 [PRI/-SEC, A10, A9, A8]
        AND  MX,0111b   ;F52, set for -secondary mode
;
; !!! NOTE !!!
;    Maybe we should save this value in a flag and occasionally output it
;    in case some piece of the code overwrites it.
;
;    Primary/Secondary issues are settled. Return to initialization in bank 0
;
PRI_exit:
;    now set R1 back high
        LD   X,51h      ;F50, port R0 [A3, A2, A1, A0]
        LD   MX,1111b   ;F50 & F51, set R0X and R1X high [A7-A0]
;    jump back
        PSET INIT6
        JP   INIT6
;==============================================================================
```

I claim:

1. A method of receiving caller identification (CID) information in a telephone system having a plurality of customer premises equipments (CPEs) coupled to a single telephone line, each of the CPEs including a corresponding telephone, the method comprising the steps of:

selecting one of the plurality of CPEs as a primary customer premises equipment (CPE);

monitoring the single telephone line with each CPE to determine if the single telephone line is in an off-hook condition, and when the single telephone line is determined to be in an off-hook condition, then performing the following steps:

monitoring the single telephone line with each CPE to detect when a CPE alerting signal (CAS) tone is received;

using each CPE to disconnect the telephone corresponding to the CPE when a CAS tone is detected;

monitoring the single telephone line with each CPE to determine whether the single telephone line is in an on-hook condition;

if the single telephone line is determined to be in an on-hook condition, establishing an off-hook condition with the primary CPE;

generating an acknowledge signal with the primary CPE and transmitting the acknowledge signal to the single telephone line; and receiving the CID information transmitted on the single telephone line with each CPE.

2. The method of claim 1, further comprising the step of displaying the received CID information with each CPE.

3. The method of claim 1, further comprising the steps of:

using each CPE to reconnect the telephone corresponding to the CPE after receiving the CID information; and removing the off-hook condition established by the primary CPE.

4. The method of claim 1, wherein each CPE further performs the step of determining whether the CPE is the primary CPE.

5. The method of claim 1, wherein the step of selecting one of the plurality of CPEs as a primary CPE further comprises the step of programming one of the CPEs using jumper connections, a register, flip-flop, or memory.

6. The method of claim 1, further comprising the step of preventing each CPE from terminating the single telephone line, thereby placing each CPE in an on-hook condition when a CAS tone is detected, wherein the step of preventing is performed before the step of monitoring the single telephone line with each CPE to determine whether the single telephone line is in an on-hook condition.

* * * * *